(12) United States Patent
Whitney

(10) Patent No.: US 6,339,985 B1
(45) Date of Patent: Jan. 22, 2002

(54) COFFEE MAKER

(76) Inventor: Robert R. Whitney, 7110 Day St., Dallas, TX (US) 75227

( * ) Notice: Subject to any disclaimer, the term of this patent is extended or adjusted under 35 U.S.C. 154(b) by 0 days.

(21) Appl. No.: 09/243,665

(22) Filed: Feb. 1, 1999

Related U.S. Application Data

(60) Provisional application No. 60/073,497, filed on Feb. 3, 1998.

(51) Int. Cl.⁷ .................................................. A47J 31/42
(52) U.S. Cl. ......................... 99/286; 99/287; 99/289 R; 99/290
(58) Field of Search ...................... 99/286, 287, 289 R, 99/290

(56) References Cited

U.S. PATENT DOCUMENTS 5,241,898 A * 9/1993 Newman ...................... 99/286
5,511,465 A * 4/1996 Friedrich et al. ............. 99/286

OTHER PUBLICATIONS

World Wide Web page of "KRUPS Online Store" describing "Orchestro Fully–Automatic Pump Espresso, Cappuccino, Latte, and Coffee Maker". Dated Nov. 9, 1999. City and State unknown.

World Wide Web page of "Cuisinart" describing "Cuisinart 10 cup Grind and Brew Coffeemaker". Dated Nov. 30, 2000. Cuisinart, East Windsor, New Jersey.

* cited by examiner

Primary Examiner—Curtis Sherrer
Assistant Examiner—Hao Mai

(57) ABSTRACT

An automated coffee making process that uses a multi-stage combination coffee brewer and grinder that produces coffee of superb aroma and taste. The coffee making process is controlled by the consumer by means of a control panel located on the front of the coffee maker. Using the control panel, the consumer can select the time the coffee making process begins and the strength of the coffee prepared. The coffee making process is a closed loop cyclic process comprising a coffee making cycle and a self-cleaning cycle. The cleaning cycle cleans the filter and the cooking section of the coffee maker which ensures a delicious cup of coffee every time. The coffee maker comprises a motor section, a can section, a grinding section, a cooking section, and a pot section. The freshly prepared coffee is brewed in the cooking section. After a period of time that is selected by the consumer, the coffee residing in the cooking section is discarded, the coffee maker is cleaned, and freshly brewed coffee is prepared.

17 Claims, 22 Drawing Sheets

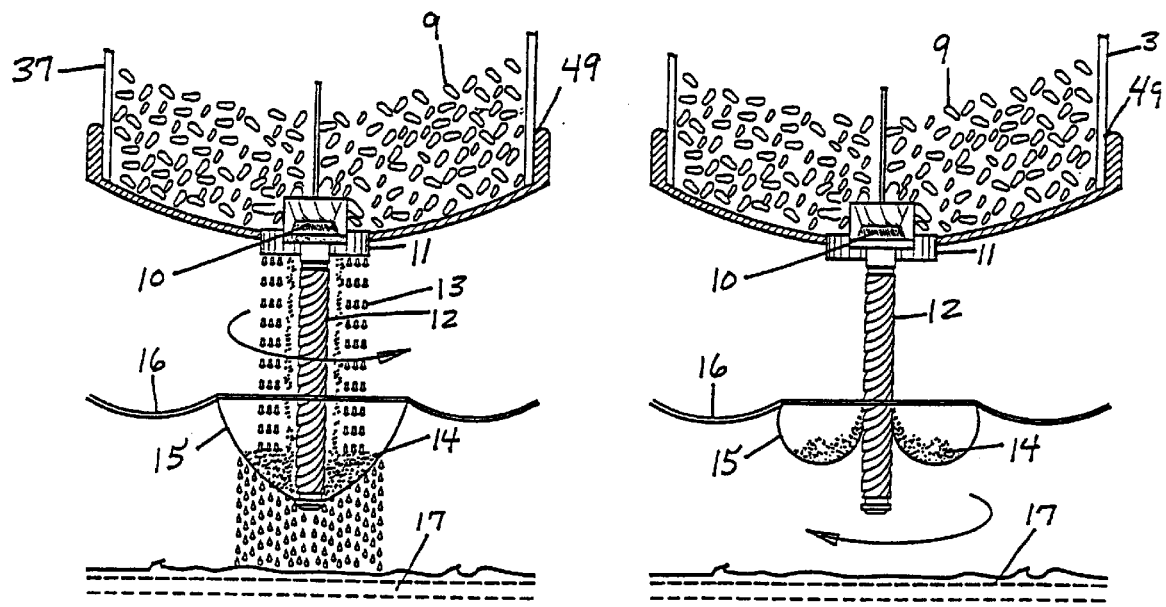
*Fig. 4A*  *Fig. 4B*
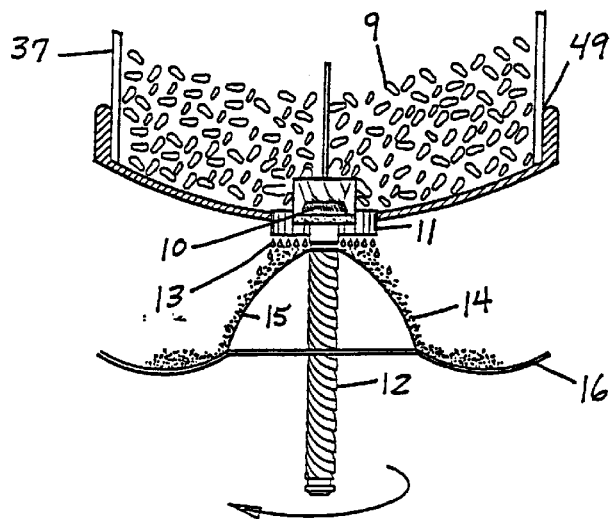
*Fig. 4C*

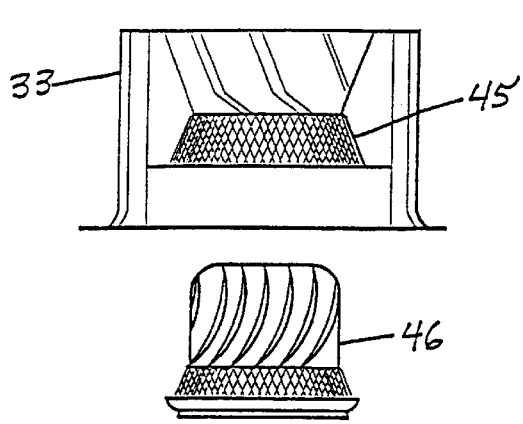
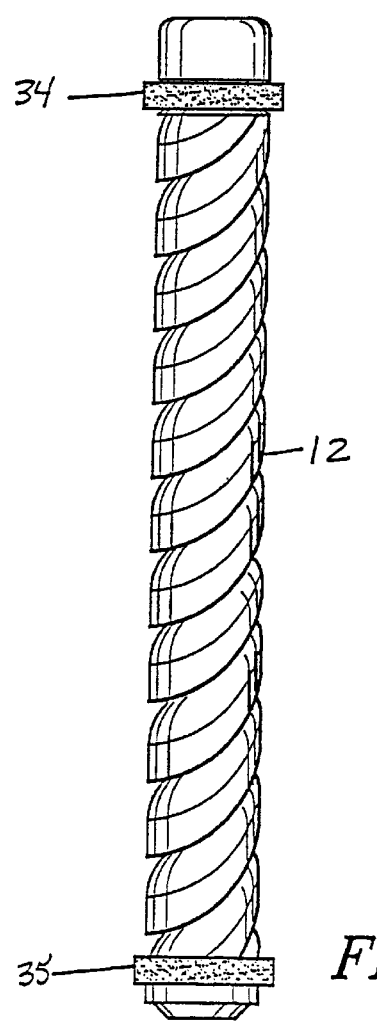
*Fig.12*
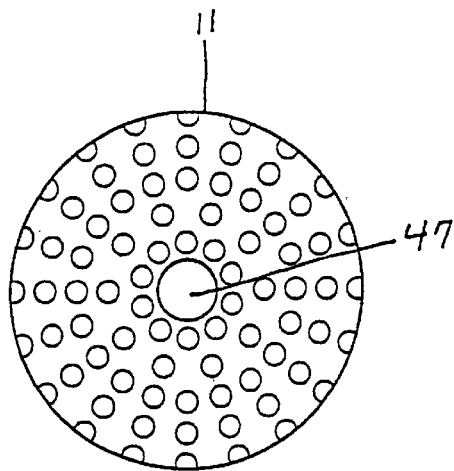
*Fig.13*
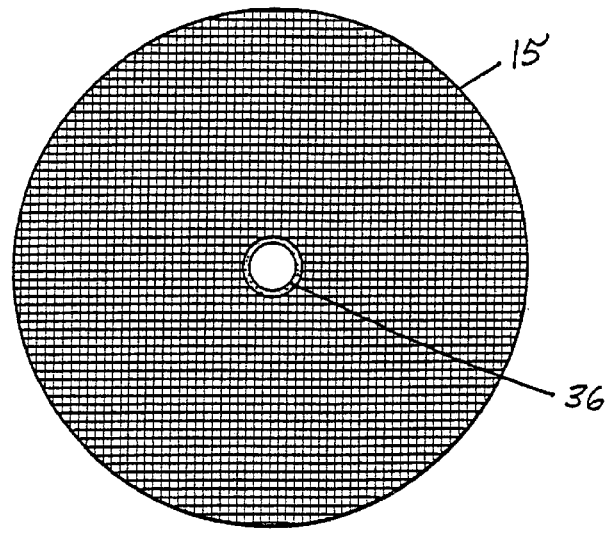
*Fig.14*

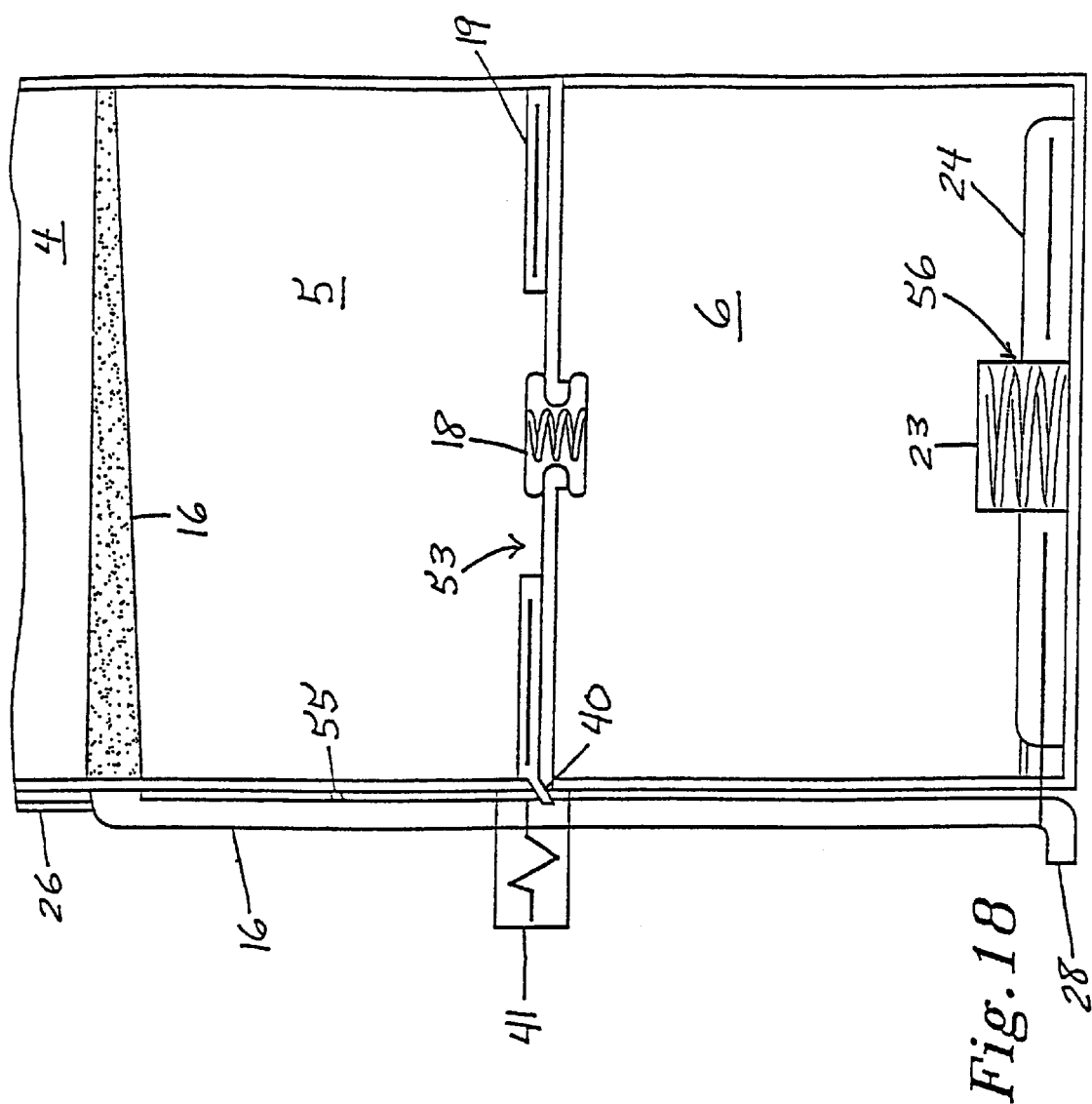

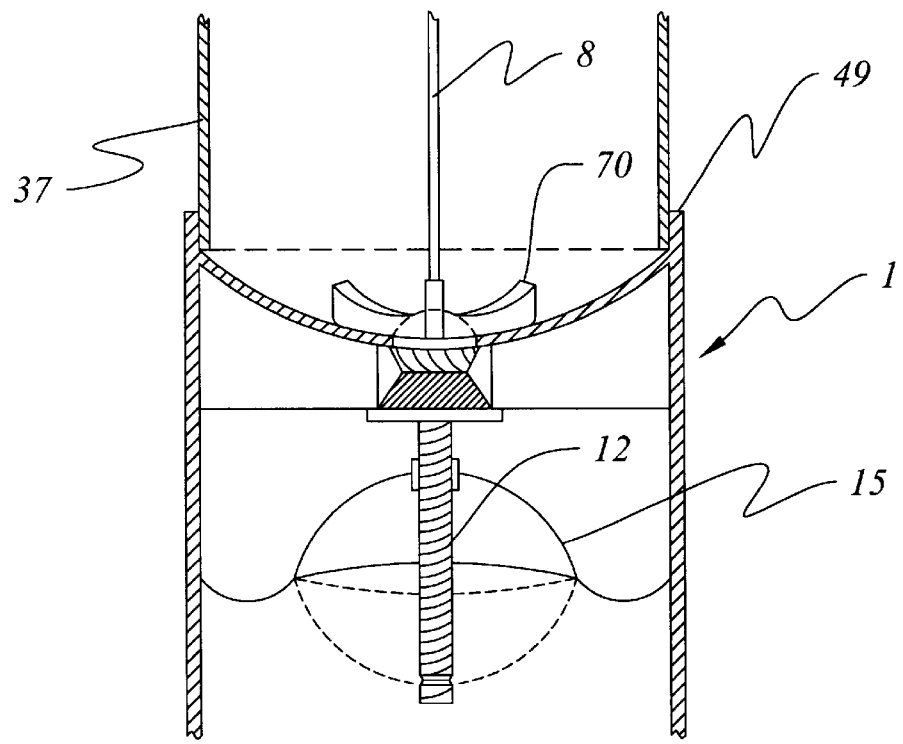
Fig. 21
Fig. 22
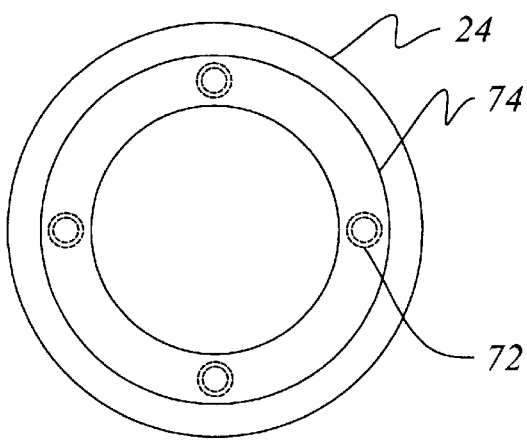
Fig. 23
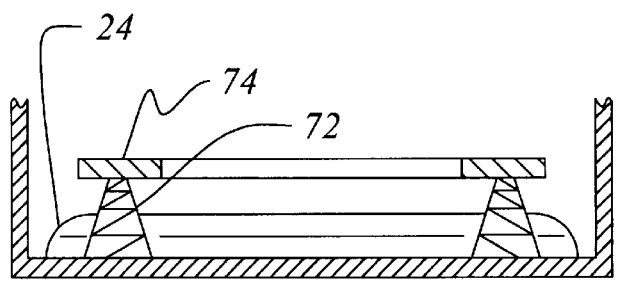

*Fig. 28*
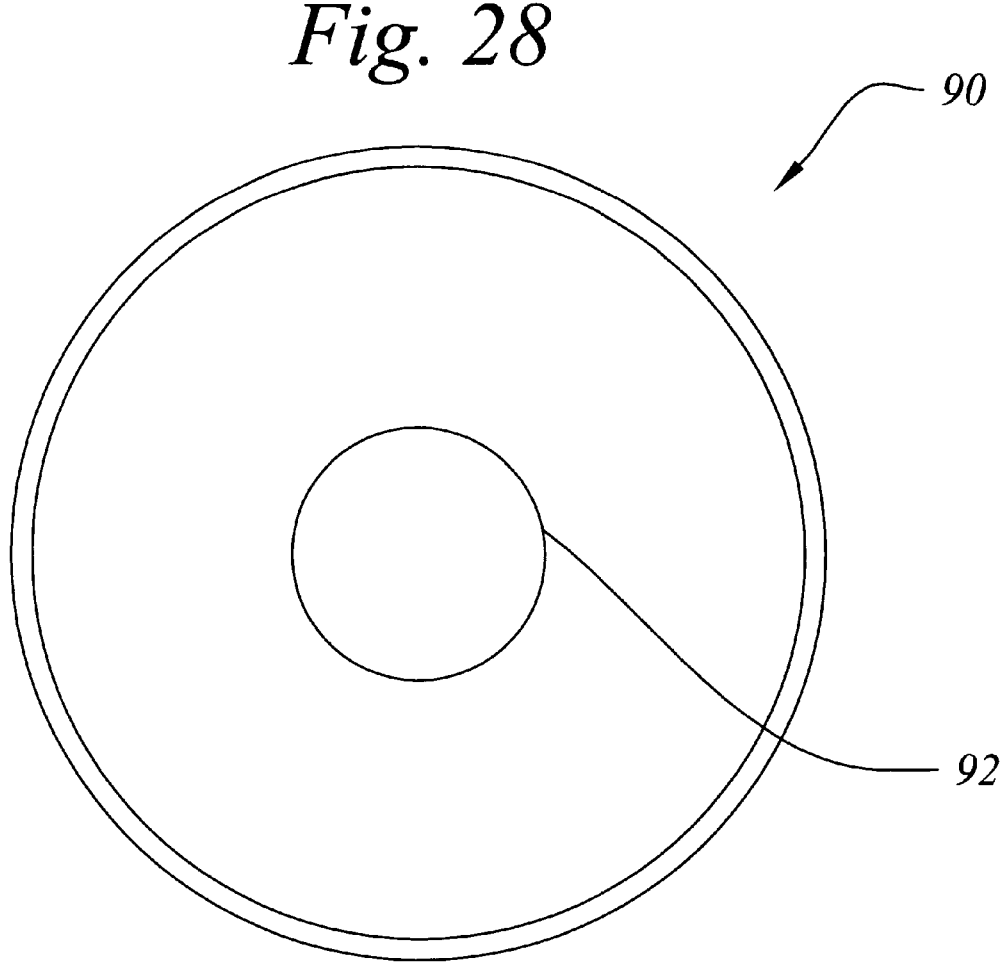
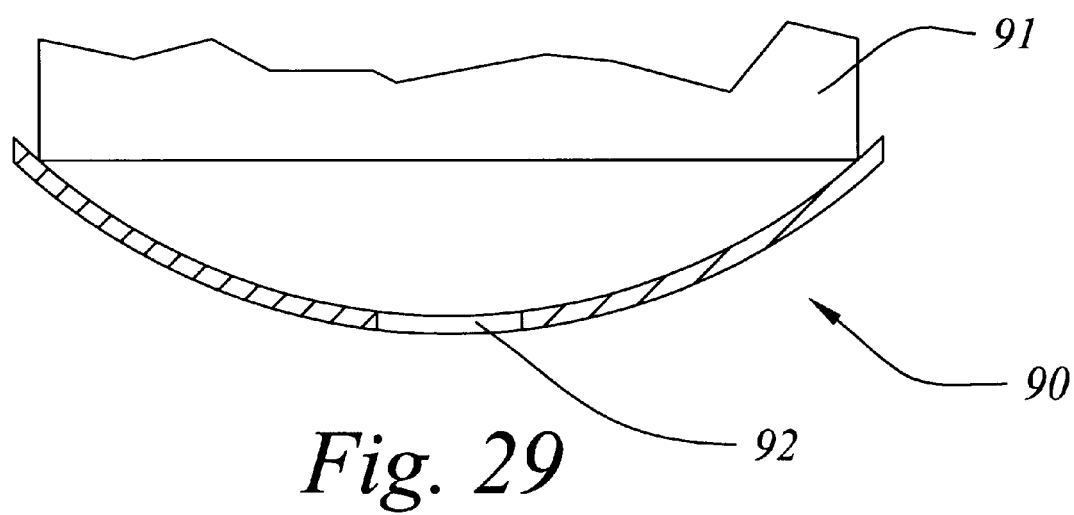
*Fig. 29*

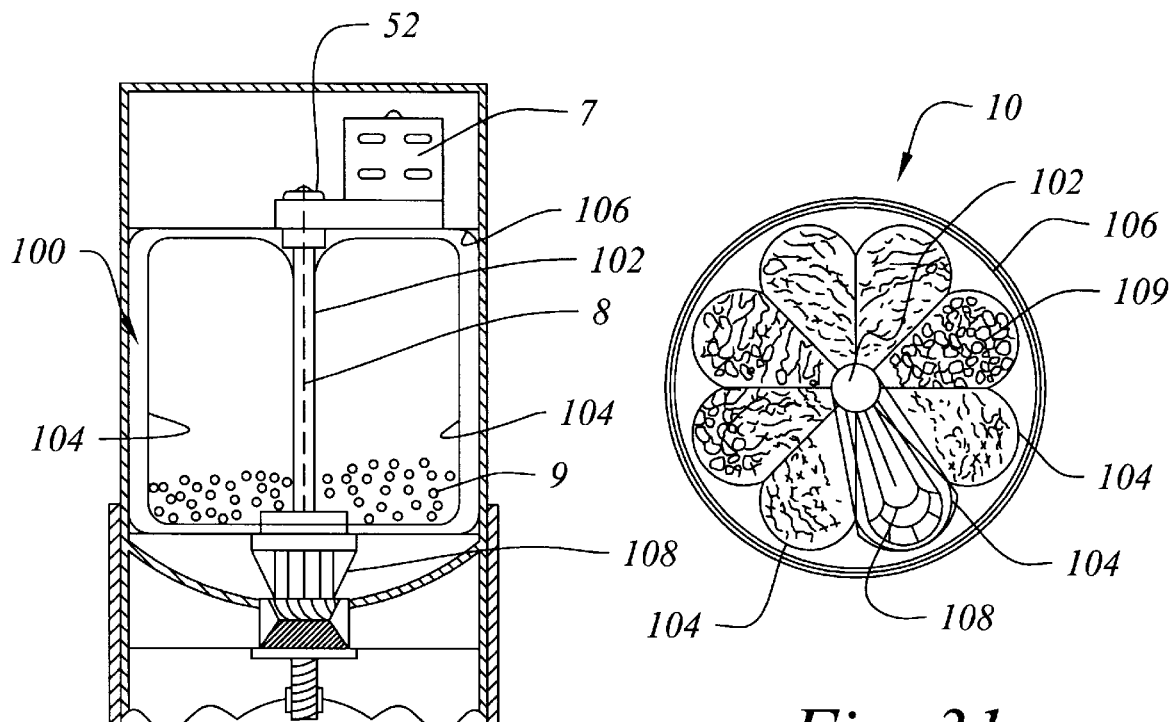
Fig. 30
Fig. 31
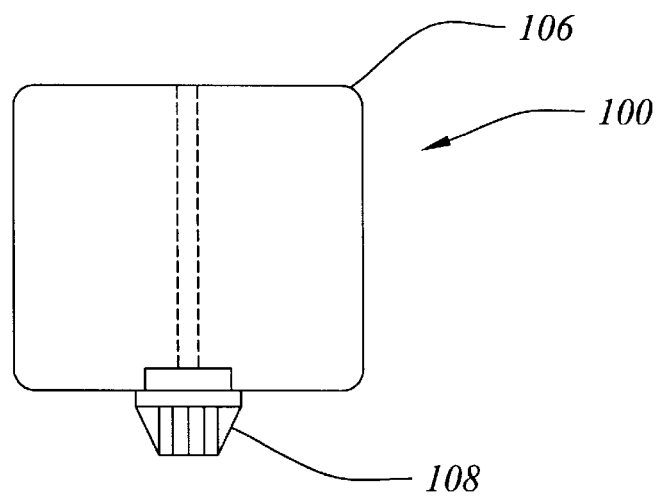
Fig. 32

COFFEE MAKER

CROSS REFERENCES TO RELATED APPLICATIONS

This application claims the benefit of U.S. Provisional Application No. 60/073,497, filed Feb. 3, 1998.

BACKGROUND OF THE INVENTION

1. Field of the Invention

The present invention relates to a coffee processing machine, and particularly, to a multi-stage coffee grinder and brewer having continuous coffee brewing and automatic filter cleaning capabilities.

2. Description of the Related Art

A key factor in obtaining and enhancing the maximum amount of enjoyment possible when having a cup of freshly brewed coffee is the aroma. It is a well established fact that the sense of smell greatly increases the flavor of either food or beverage. Therefore, it is no exaggeration to say that the aroma of freshly brewed coffee is essential to achieving total satisfaction when consuming a freshly brewed cup of coffee. Because the flavor of coffee rapidly deteriorates after the coffee is ground or after the vacuum seal on the coffee can is broken, it is important that the full flavor of the coffee be captured as quickly as possible.

Given the popularity of freshly brewed coffee at home, at work, in restaurants, and in the food service industry in general, there exist a need for a coffee maker that is easy to clean and maintain and that produces freshly brewed coffee with a rich and full aroma and taste that is easy to make. However, the prior art does not describe any process or coffee maker that provides a person with a highly aromatic freshly brewed cup of coffee at any time.

For example, U.S. Pat. No. 5,083,502 issued on Jan. 28, 1992 to Kazuo Enomoto describes a coffee making machine that automatically produces coffee from unroasted coffee beans. The coffee making machine consists of a roaster for holding the coffee beans and roasting the coffee beans, a milling/extracting unit for grinding the roasted coffee beans into ground coffee and extracting coffee solution from the ground coffee, a blower for blowing air into the milling/extracting unit to cool the roasted coffee beans before they are ground, and a pouring unit for pouring hot water onto the ground coffee to extract a coffee solution that is received by a coffee server.

U.S. Pat. No. 5,267,507 issued on Dec. 7, 1993 to Kazuo Enomoto describes a coffee maker that is easily cleaned after brewing and that easily disposes of used coffee grounds. Thus, the coffee maker is immediately capable of being reused. The fully automatic coffee maker provides freshly brewed coffee from raw coffee beans through a process of roasting, grinding, and brewing the coffee. The coffee maker consists of a roaster that roasts the raw coffee beans, a cooling means for cooling the coffee beans roasted by the roaster, a grinding means for grinding the beans and supplying the ground coffee, and a heating and a water supply means that heats and supplies the water from a water tank, and a decanter that functions as a receptacle for the brewed coffee.

Making a cup of coffee requires placing a drip filter in the filter basket and securing the filter basket to the ceiling part of the decanter placement space. The ground coffee beans are drop supplied through the drop supply opening in the ceiling part of the decanter placement space into the filter basket while hot water is also drop supplied through drop supply openings in the ceiling part of the decanter into the filter basket. The brewed coffee is then dripped into the decanter. For reuse the coffee maker requires opening the filter basket and removing the filter along with the coffee grounds, and inserting a new filter.

U.S. Pat. No. 5,285,705 issued on Feb. 15, 1994 to Donald R. Buttle et al describes a beverage mixing apparatus such as a coffee grinding and brewing apparatus that includes the transportation of a predetermined amount of a solid component of a beverage mixture from a storage compartment to and through a passageway into a mixing chamber wherein the liquid component of the beverage is mixed with the solid component. The apparatus has a valve assembly associated with the passageway and having a plate movable between a closed position and an open position. When the plate is in its open position the solid component can be moved from the storage chamber to the mixing chamber, and when the plate is in its closed position, the plate prevents moisture from the mixture from moving to the storage chamber through the passageway.

The Buttle et al patent further discloses that the typical combination coffee grinding and brewing apparatus employs a hopper that upon a signal discharges beans into a proportioning device that measures the desired quantity of beans. The beans are then transferred to a grinder that grinds the beans to a desired consistency after which the ground coffee is delivered to a filter within the brewing basket immediately before hot water is sprayed over the coffee grounds. Moisture emanating from the hot water tank and brewing basket can reach the interior of the grinder assembly. Wetting of the coffee grounds prior to reaching the brewing basket is undesirable, particularly when the coffee grounds are still in the grinder itself because the moisture causes problems with the proper distribution of the ground coffee to the brew basket; in addition, the brew basket is difficult to clean.

U.S. Pat. No. 5,463,932 issued on Nov. 7, 1995 to Allen W. Olson describes a coffee maker that includes a housing that supports a coffee grinder for grinding coffee beans, and a brewer that includes a reservoir for holding water, a filter basket for receiving ground coffee beans discharged from the grinder and water from the reservoir, a pump in fluid communication with the reservoir, and a heater for heating water from the reservoir. The coffee maker also includes a thermally insulated carafe for receiving the brewed coffee from the filter basket of the brewer. A central processing unit having a memory is connected to the pump, heater, and grinder. Thus, the operation of the coffee maker is based on data stored in the memory of the central processing unit. The Olson patent discloses that ground coffee beans quickly lose their aroma and that brewed coffee in a pot loses its aroma over time.

None of the above inventions and patents, taken either singly or in combination, solve the aforementioned problems. The prior art does not describe a method of making freshly brewed coffee and a coffee maker that provides the consumer with freshly brewed coffee that has a superior aroma and taste at any time.

SUMMARY OF THE INVENTION

Accordingly, it is a principal object of the invention to provide a coffee maker that cleans itself after each cycle of coffee making.

It is another object of the invention to provide a coffee maker and a method of making freshly brewed coffee that is fully automatic.

It is a further object of the invention to provide a coffee maker and a method of making freshly brewed coffee that prevents coffee beans from being exposed to moisture.

Still another object of the invention is to provide a coffee maker and a method of making freshly brewed coffee without having to change the coffee filter each time fresh coffee is brewed.

Still another object of the invention is to provide a coffee maker and a method of making freshly brewed coffee that automatically discards brewed coffee that is not fresh and replaces it with freshly brewed coffee.

It is an object of the invention to provide improved elements and arrangements thereof in an apparatus for the purposes described which is inexpensive, dependable and fully effective in accomplishing its intended purposes.

The present invention is a coffee processing machine that is a combination multi-stage coffee grinder and brewer. The present invention is capable of both continuous coffee brewing and automatic self-cleaning. To accomplish the foregoing objectives, the coffee maker according to this invention includes a motor section that houses a motor used to rotate an auger, a can section that is adapted for receiving coffee beans (roasted or unroasted), a grinding section that consists of a grinding system of gears that converts coffee beans received from the can section into coffee grounds, a cooking section in which hot water is automatically supplied for continuous coffee brewing, and a pot section where a removable coffee server is placed.

The grinding section is adapted to automatically clean the filter unit and the cooking section is adapted to automatically discard brewed coffee that is no longer fresh and to replace it with freshly brewed coffee.

These and other objects of the present invention will become readily apparent upon further review of the following specification and drawings.

BRIEF DESCRIPTION OF THE DRAWINGS

FIG. 4A is an enlarged scale front view of the filter collecting the coffee grounds.

FIG. 4B is an enlarged scale view of the filter inversion.

FIG. 4C is an enlarged scale view of the filter cleaning process.

FIG. 12 is an exploded view of the grinder-auger assembly.

FIG. 13 is a top view of the water sprayer.

FIG. 14 is a top view of the screen type filter.

FIG. 17 is a front view of the coffee can showing the dome shape surface.

FIG. 18 is a side view of the cooking section showing the location of the solenoid valve.

FIG. 21 is an cross sectional view of embodiment of invention having an propeller-type agitator.

FIG. 22 is a top view of another embodiment of the heater with an upwardly spring biased support ring on which the coffee server rests.

FIG. 23 is a cross sectional view of another embodiment of the heater depicted in FIG. 22 with an upwardly spring biased support ring on which the coffee server rests.

FIG. 28 top plan view of an adapter for permitting a traditional cylindrical coffee can to be used in the place of the can section.

FIG. 29 is a cross sectional view of the adapter in FIG. 28 illustrating its position on a traditional coffee can.

FIG. 30 is a cross sectional view of an embodiment of the present invention with a container carousel in the can section for holding several different types or varieties of coffee beans in the can section in such a manner that users may select which type of coffee beans they would like for coffee prepared by the present invention.

FIG. 31 is a transverse cross section of the container carousel to illustrate the plurality of containers in the container carousel.

FIG. 32 is a side view of the container carousel removed from the can section.

Similar reference characters denote corresponding features consistently throughout the attached drawings.

DESCRIPTION OF THE PREFERRED EMBODIMENT

Figure 1:
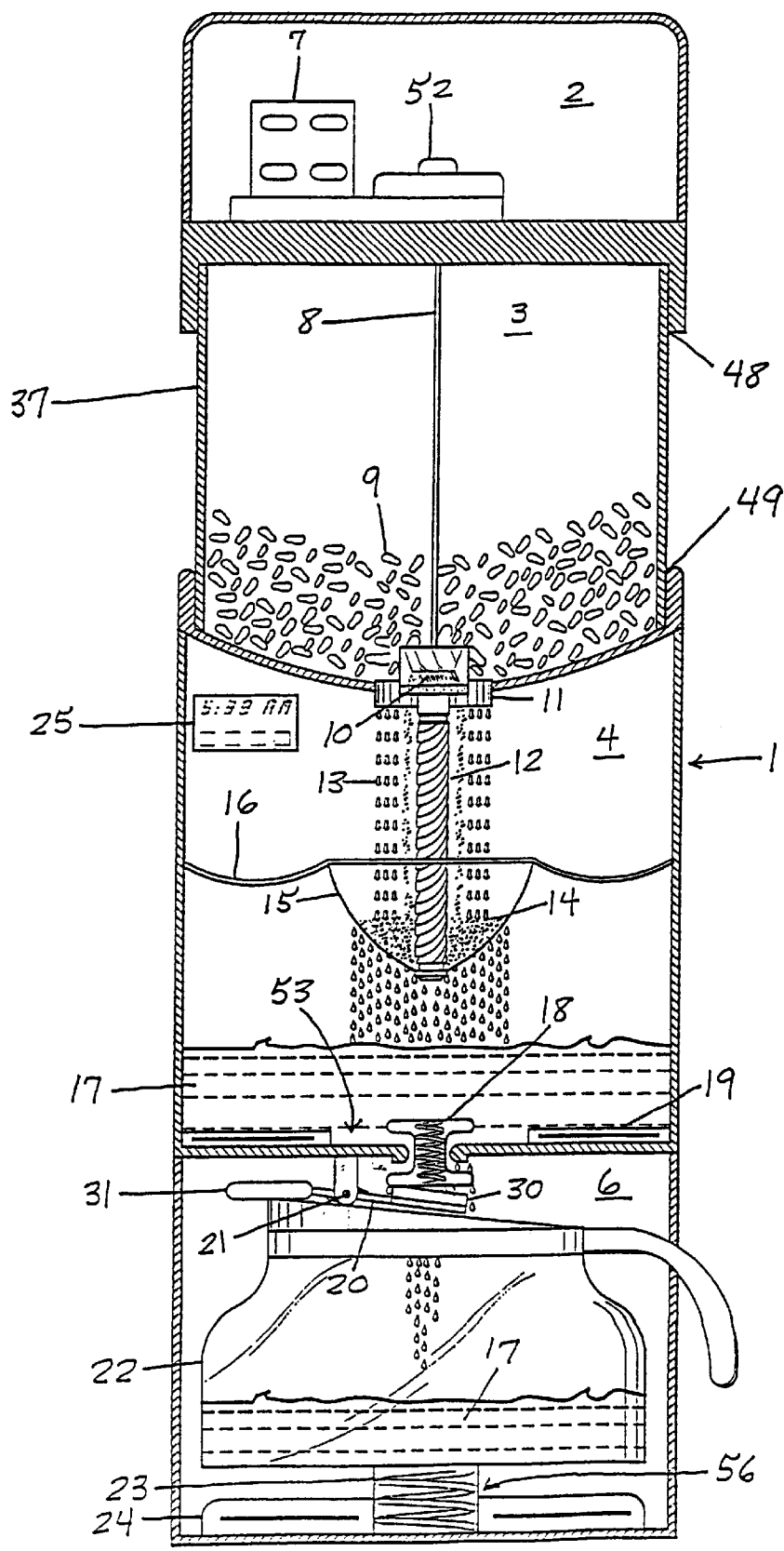
FIG. 1 is a partly cross-sectional, front elevational view of the invention.
Figure 2:
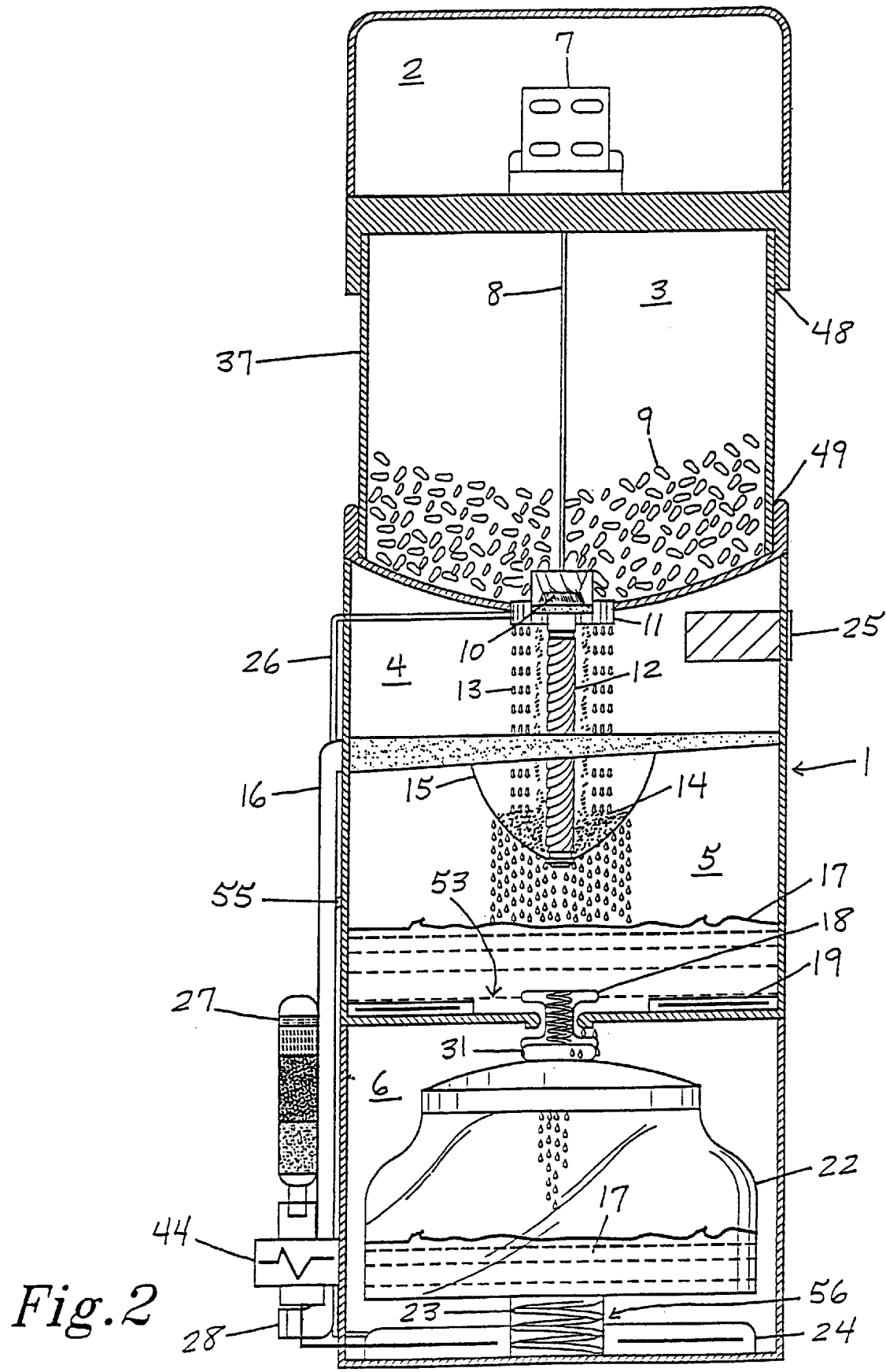
FIG. 2 is a partly cross-sectional, side elevational view of the invention.
Figure 3:
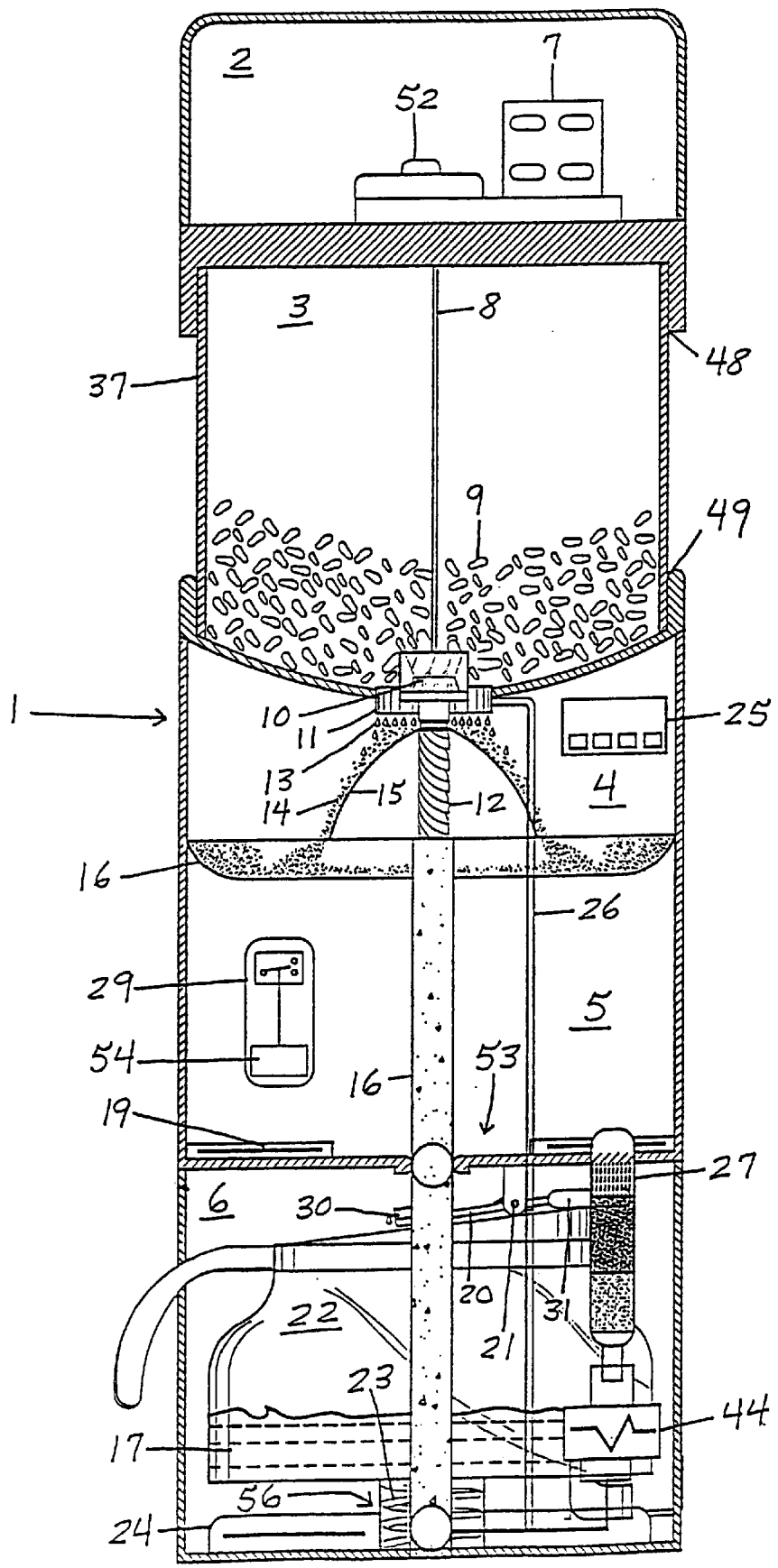
FIG. 3 is a partly cross-sectional, rear elevational view of the invention.

The present invention will now be explained with reference to the drawings. FIG. 1 is a front view of the present invention, FIG. 2 is a side view of the present invention, and FIG. 3 is a rear view of the present invention. The 110 volt motor 7 which is connected to a gearbox 52 that turns the shaft 8 that rotates the auger 12 is housed in the motor section 2 of the coffee maker 1. The gearbox 52 is also located in the motor section 2. The can section 3 of the coffee maker 1 which is situation immediately beneath the motor section 2 houses a can of coffee beans 9. The coffee beans 9 are either roasted or unroasted. Both the top and the bottom of the coffee can 37 (shown in cross-section) have openings through which the shaft 8 that turns the auger 12 is inserted. The can section 3 is comprised of the coffee can 37. Both the motor section 2 that is mounted on the coffee can 37 and the grinding section 4 onto which the coffee can 37 is mounted contain seals 48, 49 that prevent moisture from entering the system, especially the coffee can.

Directly beneath the can section 3 is the grinding section 4 of the coffee maker 1, where the rotation of an auger 12 grinds the coffee beans 9 into coffee grounds 14. The auger 12 has a top grinder 45 and a bottom grinder 46 with the top grinder 45 fitting over the bottom grinder 46 to form a single grinder 10 situated in a hollow enclosure 33 that funnels the coffee beans 9 into the grinder 10. The ground coffee 14 is deposited into a concave shape filter 15.

Figure 8:
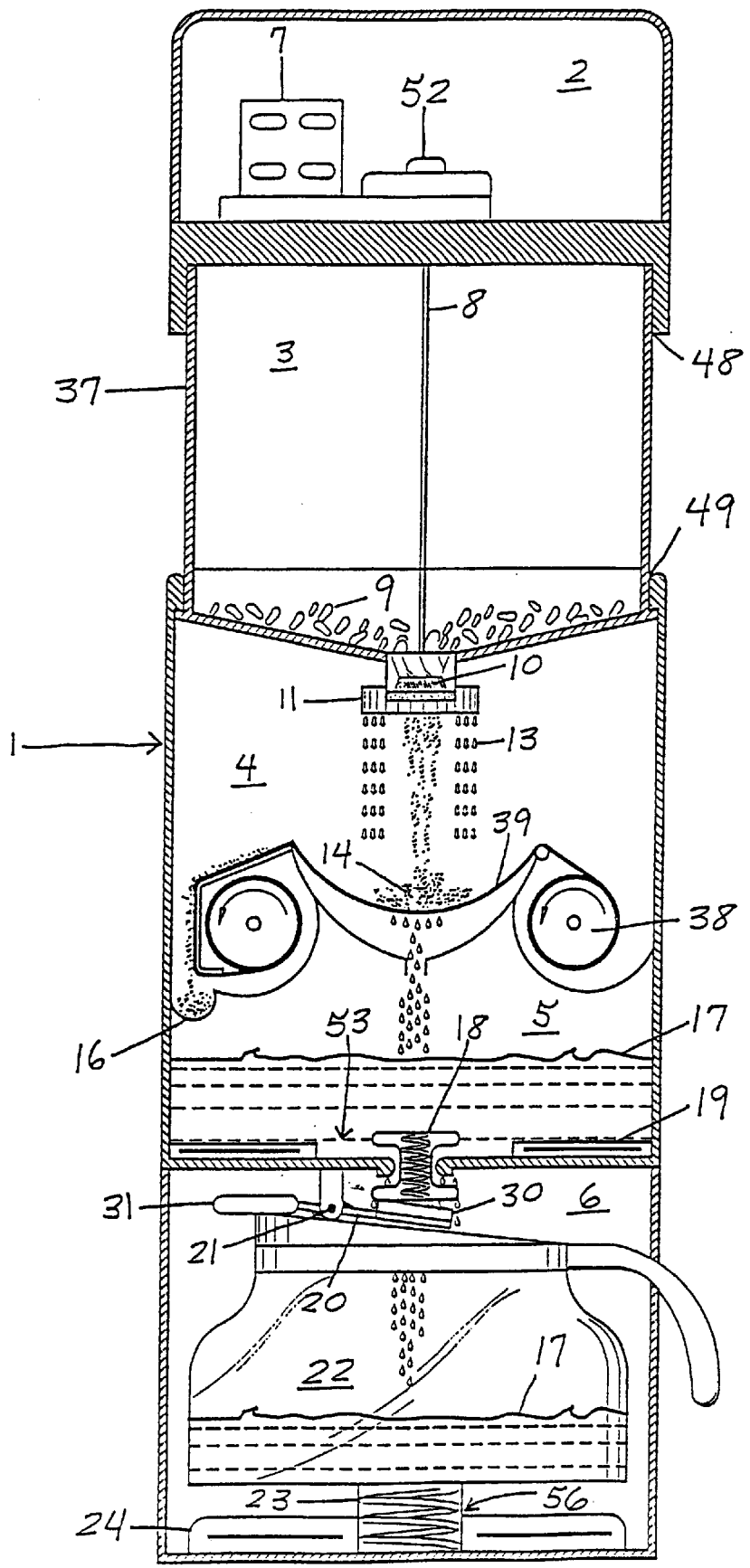
FIG. 8 is a front view of the coffee maker with a filter on rolls.

The location of the grinder 10 in relation to the base of the coffee can 37 can be varied. For example, the grinder 10 can extend up into the coffee can 37 as shown in FIG. 1 or the grinder 10 can reside at the base of the coffee can 37 as shown in FIG. 8. The location of the grinder 10 in relation to the base of the coffee can 37 is independent of the type of filter used.

Encircling the grinder 10 is a water sprayer 11 that sprays steaming hot water 13 in a downward direction into the concave filter 15. As the steaming hot water 13 is sprayed and passes downward and through the coffee grounds 14, a coffee solution 17 is extracted and accumulates in the cooking section 5 of the coffee maker 1. The coffee 17 continues to brew in the cooking section 5 which contains a donut type heater 19 with a center opening 53. The donut type heater 19 in the cooking section 5 maintains the proper brewing temperature to maximize the brewing process to ensure that superior aroma and taste of the freshly brewed coffee 17 is achieved.

As the appropriate brewing temperature is maintained by the donut type heater 19 of the cooking section 5, the release of the freshly brewed coffee 17 into the coffee server 22 is regulated by a temperature sensitive bimetal plug 18 that only opens when the proper temperature for the freshly brewed coffee 17 is reached. The bimetal plug 18 is disposed in the center opening 53 of the donut type heater 19. A magnet (not shown) is attached to the bottom of the bimetal plug 18. A float switch 29 located on the rear of the coffee maker 1 controls the level of coffee 17 brewing in the cooking section 5. A component 54 of the float switch 29 is in physical contact with the coffee 17. The float switch 29 keeps the coffee 17 brewing in the cooking section 5 from coming in contact with the filter 15 in the grinding section 4. When the level of the coffee 17 brewing in the cooking section 5 becomes too high, the coffee making process stops until the level of coffee 17 brewing in the cooking section recedes.

Therefore, the float switch 29 opens when the coffee 17 level in the cooking section 5 becomes too high and closes when the coffee 17 level in the cooking section 5 is no longer too high. As a safeguard should the float switch 29 fail to operate properly, the cooking section 5 contains an overflow outlet 55 that consists of an opening 55 situated at a level slightly below the bottom of the auger 12 and that connects to the drain 6 to siphon off any excess coffee 17.

The pot section 6 contains the removable coffee server 22. The coffee server 22 is either a cup or a pot or any suitable beverage receptacle. The coffee server 22 resides on top of a tension bearing means 23 and a second donut type heater 24 with a center opening 56. The tension bearing means 23 is disposed in the center opening 56 of the second donut type heater 24. In a preferred embodiment, the tension bearing means 23 is a spring 23. The donut type heater 24 of the pot section 6 is used to keep the freshly brewed coffee 17 in the coffee server 22 at the proper serving temperature. A pivoting arm 20 pivots around a spring 21 that is situated slightly off center of the midpoint of the arm 20. The pivoting arm 20 has a protuberance 31 at one end and a magnet 30 at the other end. The pivoting arm 20 also controls the release of freshly brewed coffee 17 in the cooking section 5 to the coffee server 22.

When the coffee server 22 is empty there is minimal tension in the spring 23 on which the coffee server 22 is seated; therefore, the coffee server 22 is at its maximum height in the pot section 6 of the coffee maker 1 and in direct contact with the protuberant end 31 of the pivoting arm 20 of the pot section 6. The height of the coffee server 22 is sufficient to push the protuberant end 31 of the pivoting arm 20 to its maximum upward displacement within the pot section 20 which forces the magnet 30 bearing end of the pivoting arm 20 to its maximum downward displacement in the pot section 6 which allows, provided that the bimetal plug 18 is open, freshly brewed coffee 17 to pour freely from the cooking section 5 of the coffee maker 1 into the coffee server 22.

As the coffee server 22 fills with freshly brewed coffee 17, the weight of the coffee server 22 compresses the underlying spring 23 and the coffee server 22 is displaced in the downward direction. When the coffee server 22 is completely filled with freshly brewed coffee 17, the underlying spring 23 is fully compressed (maximum tension) with the coffee server 22 resting near the bottom of the pot section 6. The coffee server 22 is no longer in contact with the protuberant end 31 of the pivoting arm 20; therefore, the pivoting arm 20 returns to a reposed position with the magnet 30 bearing end of the pivoting arm 20 closing the opening between the cooking section 5 and the pot section 6. The magnetic attraction between the magnet (not shown) at the base of the bimetal plug 18 and the magnet 30 of the pivoting arm 20 creates a tight seal that prevents seepage of the freshly brewed coffee 17 from the cooking section 5 into the coffee server 22.

The donut type heater 24 of the pot section 6 not only maintains the proper serving temperature of the freshly brewed coffee 17 in the coffee server 22 but in addition heats the water 13 that is sprayed into the coffee grounds 14 in the grinding section 4 of the coffee maker 1.

The coffee maker 1 is fully automatic and continuously cycles between the coffee making cycle and the cleaning cycle during which the coffee maker 1 cleans itself. During the coffee making cycle, coffee beans 9 from the coffee can housed in the can section 3 of the coffee maker 1 are dispensed from the coffee can 37 through an opening in the base of the coffee can 37 through which the shaft 8 that turns the auger 12 passes. As the coffee beans 9 leave the coffee can, the coffee beans 9 immediately encounter the grinder 10 which grinds the coffee beans 9 into coffee grounds 14. The grinder 10 comprises a top grinder 45 and bottom grinder 46 as shown in FIG. 12. The top grinder 45 and the bottom grinder 46 are brought together to form a single unit 10. The coffee grounds 14 are sprayed with steaming hot water 13 from a sprayer 11 that encircles the grinder 10. The coffee grounds 14 fall into a concave shaped filter 15 located beneath both the grinder 10 and the sprayer 11.

Coffee solution 17 is extracted from the coffee grounds 14 by the steaming hot water 13 as the water 13 passes through both the coffee grounds 14 and the filter 15. The extracted coffee solution 17 is collected in the cooking section 6 of the coffee maker 1 where the coffee solution 17 continues to brew. A donut type heater 19 in the bottom of the cooking section 5 keeps the coffee solution 17 at the proper brewing temperature. The proper brewing temperature is preset. When the freshly brewed coffee 17 reaches the appropriate temperature which is also preset, the bimetal plug 18 opens. If the pot section 6 of the coffee maker 1 contains a coffee server 22, then freshly brewed coffee 17 is released into the coffee server 22.

During the cleaning cycle, the screen type filter 15 containing the coffee grounds 14 is cleaned and the coffee solution 17 residing in the cooking section 5 of the coffee maker 1 is discarded. The screen type filter 15 is cleaned by inverting the concave shaped screen type filter 15 into a convex shaped screen type filter 15 by reversing the direction of rotation of the auger 12.

When the auger 12 rotates in a counterclockwise direction, coffee beans 9 arc ground and the screen type filter 15 has a concave shape. An o-ring 35 at the bottom of the auger 12 forms a tight seal in the center of the screen type filter 15 which prevent coffee grounds 14 from escaping from the filter 15 and contaminating the coffee solution 17 stored in the cooking section 5 of the coffee maker 1.

The auger 12 is rotated in a clockwise direction during the cleaning cycle. This clockwise rotation of the auger 12 causes the screen type filter 15 to change shape. The screen type filter 15 is turned inside out. The concave shape of the screen type filter 15 undergoes an inversion at the center of the filter 15 until the filter 15 takes on a convex shape. The convex shaped filter 15 encounters another o-ring 34 at the opposite end of the auger 12. The top o-ring 34 seals the center portion of the screen type filter 15 at the top of the auger 12.in the same manner as the bottom o-ring of the auger 12 sealed the center portion of the filter 15 at the bottom of the auger 12. During the transformation of the filter 15 shape from concave to convex, no water 13 is sprayed by the water sprayer 11. The filter 15 is usable for an almost indefinite period of time.

The clockwise rotation of the auger 12 prevents any more coffee beans 9 from leaving the coffee can 37. The coffee grounds 14 and any unground coffee beans 9 are removed from the filter 15 by water 13 sprayed by the water sprayer 11. The pressure of the sprayed water 13 forces the coffee grounds 14 off the filter and down into a drain 16 that removes the coffee grounds 14. The cooking section 5 of the coffee maker 1 is also connected via a passageway 40 to the drain 16. A solenoid valve 41 controls when the contents of the cooking section 5 are discarded into the drain 16 and eventually out of the coffee maker 1 via the drain outlet 28. The opening of solenoid valve 41 to drain the contents of the cooking section 5 is preset. The steaming hot water 13 from the water sprayer 11 that cleans the filter 15 also cleans the cooking section 5 of the coffee maker 1. Therefore, the solenoid valve 41 opens during the cleaning cycle to first drain off any coffee present in the cooking section 5 of the coffee maker 1 and remains open draining off the steaming hot water 13 from the water sprayer 11 that is used to clean the cooking section 5 during the cleaning cycle. Optionally, a manual valve may be used to replace the solenoid valve 41 so that a user may manual open and close the valve.

The time at which freshly brewed coffee 17 is made and the amount of coffee beans 9 ground is preset using the control panel 25 which includes a clock display located on the front of the coffee maker 1. The more coffee beans 9 ground, the stronger the coffee 17, while the more water 13 sprayed by the water sprayer 11 the weaker the coffee 17. Therefore, by using the control panel with clock display 25 gives the consumer complete control over the entire coffee making process.

A CPU or central processing unit (shown in FIG. 20) controls the onset and termination of both the coffee making cycle and the cleaning cycle. The CPU receives input from the control panel 25 and sends output to the respective components of coffee maker 1.

FIGS. 4A, 4B, 4C, 5A, 5B, 5C, 6, 7, 10, 11A, 11B, 12, 13, 14, 15, and 16 are enlarged views of components of the coffee maker 1 that have already been discussed. FIGS. 4A, 4B, and 4C show the transformation process that the filter 15 undergoes when changing from the coffee making cycle to the cleaning cycle. In FIG. 4A, the auger 12 rotates in a counterclockwise direction which results in the coffee beans 9 in the coffee can 37 being fed into the grinder 10. In FIG. 4B, the auger 12 now rotates in a clockwise direction which results in the inversion of the filter 15; that is, filter 15 is turned inside out. In FIG. 4C, the clockwise rotation of the auger 12 eventually results in the shape of the filter 15 being transformed from concave to convex.

Figure 5A:
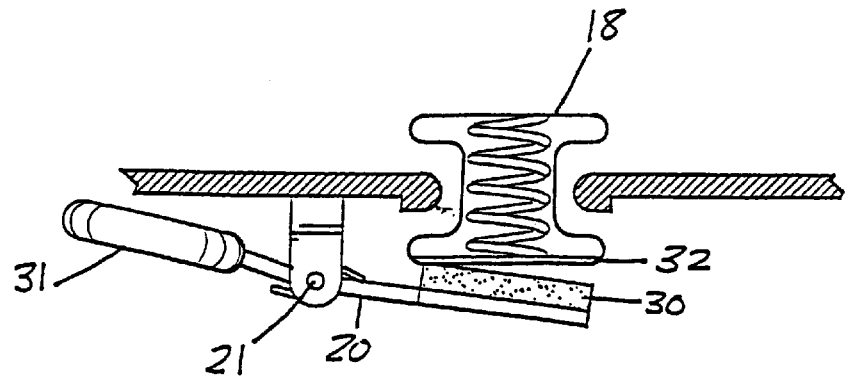
FIG. 5A is an enlarged scale front view of the bimetal plug in the open position.
Figure 5B:
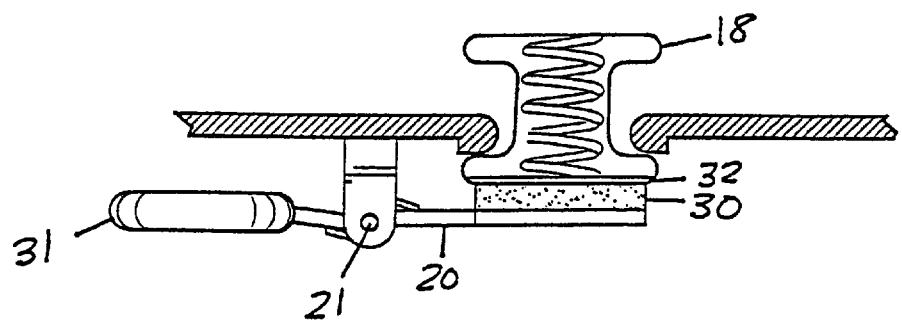
FIG. 5B is an enlarged scale view of the pivoting arm closing the opening between the cooking section and the pot section, the bimetal plug being partially closed.
Figure 5C:
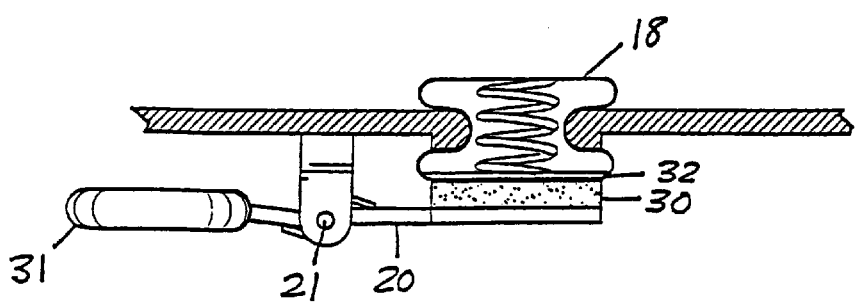
FIG. 5C is an enlarged scale front view of the bimetal plug and pivoting arm in the closed position.

FIGS. 5A, 5B and 5C show how the bimetal plug 18 and the pivoting arm 20 regulate the flow of freshly brewed coffee 17 between the cooking section 5 and the coffee server 22. In FIG. 5A, the bimetal plug 18 is hot which causes the bimetal plug 18 to become elongated, thereby allowing coffee 17 to flow from the cooking section 5 to the coffee server 22 when the pivoting arm 20 is in an open position as shown in FIG. 5A. In FIG. 5B, the bimetal plug 18 is hot and elongated; however, because the pivoting arm 20 is in the closed position with both the pivoting arm magnet 30 and the magnet 32 at the base of the bimetal plug 18 securely engaged no coffee 17 is released from the cooking section 5. In FIG. 5C, the bimetal plug 18 is cool which causes the bimetal plug 18 to become fully compressed and to occupy the entire opening 53 between the cooking section 5 and the pot section 6. As a result, no coffee can flow between the cooking section 5 and the coffee server 22 regardless of whether or not the pivoting arm 20 is in an open or closed position.

Figure 6:
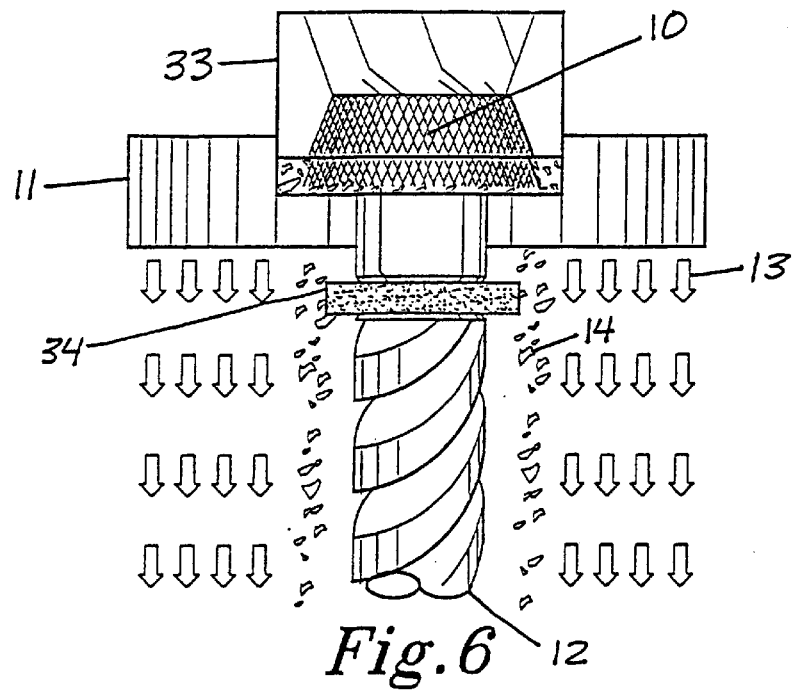
FIG. 6 is an enlarged scale front view of the water sprayer-auger assembly.

FIG. 6 is an enlarged view of the components of the grinding section 4. FIG. 6 shows the grinder enclosure 33, the grinder 10, the water sprayer 11, the upper o-ring 34, the auger 12, the water 13, and the ground coffee 14.

Figure 7:
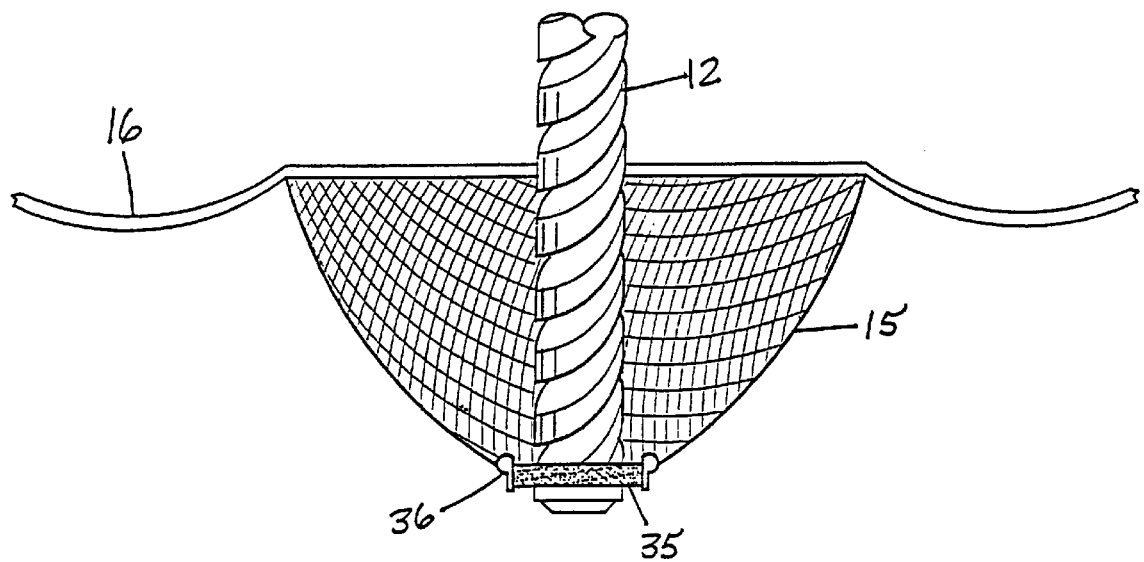
FIG. 7 is an enlarged scale front view of the screen type filter-auger assembly.

FIG. 7 is an enlarged view showing the relationships and features of specific components of the grinding section 4. FIG. 7 shows the auger 12 attached and secured to the filter 15 by the lower o-ring 35 and the net brackets 36. FIG. 7 also shows the spatial relationship between the filter 15 and the drain 16.

Figure 10:
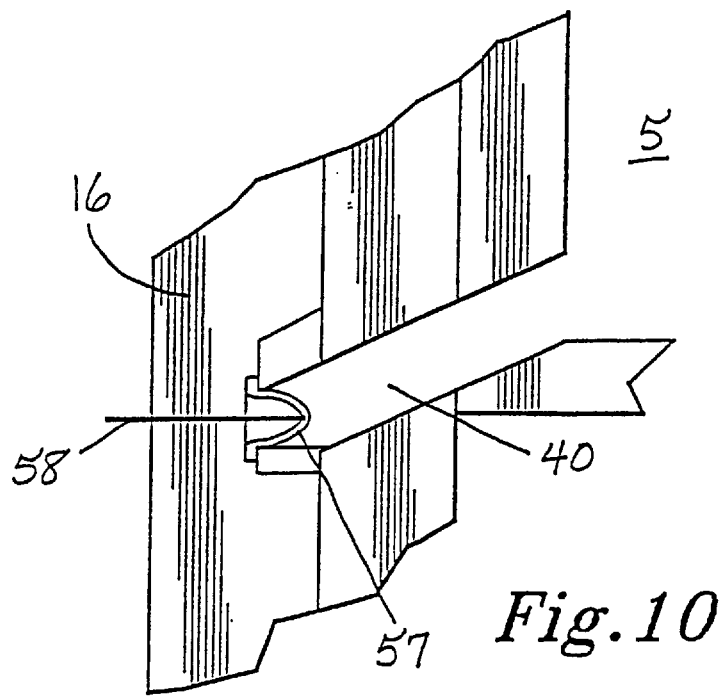
FIG. 10 is an enlarged scale perspective view of the drain for the coffee grounds and the connection between the drain and the cooking section.

FIG. 10 shows the spatial relationship between the drain 16 of the coffee maker 1, the valve 57 and the stem 58 of the long stem solenoid valve 41, and the passageway 40 connecting the cooking section 5 to the drain 16.

Figure 11A:
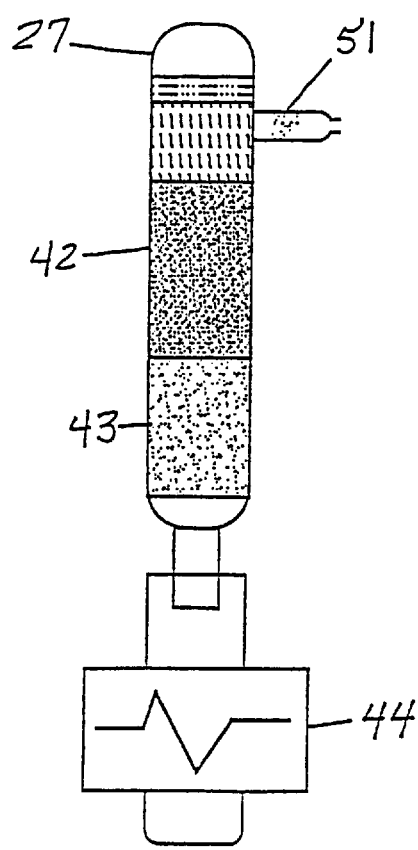
FIG. 11A is an enlarged scale side view of the water filter.
Figure 11B:
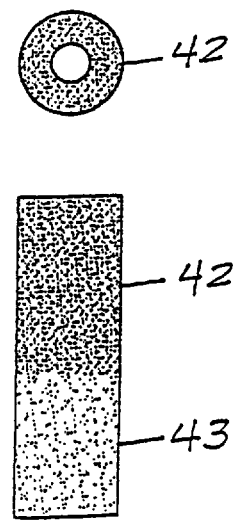
FIG. 11B is an exploded view of the water filter.

FIGS. 11A and 11B show the water filter 27 that filters the water 13 that is sprayed by the water sprayer 11 in the grinding section 4 of the coffee maker 1. FIG. 11A shows a side view of the water filter 27 which shows that the water filter 27 is comprised of two types of filtering material in a single filter casing 27. The upper half of the filter case 27 contains a dense filtering material 42 while the lower half contains a fine filtering material 43. The dense filtering material 42 is charcoal. FIG. 11A also shows the water flow control valve 44 that controls the amount of water 13 sprayed by the water sprayer 11 and the amount of water 13 taken in at the water inlet 51. FIG. 11B shows the dense filtering material 42 and the fine filtering material 43 without the filter casing 27.

FIG. 12 is an enlarged, exploded view of the grinding assembly. The grinder 10 is comprised of a top grinder 45 and a bottom grinder 46 housed inside an enclosure 33 that funnels the coffee beans 9 into the grinder 10. FIG. 2 shows the shaft 8, which is connected to the motor 7, that rotates the auger 12. FIG. 12 also shows the upper and lower o-rings 34, 35.

Figure 15:
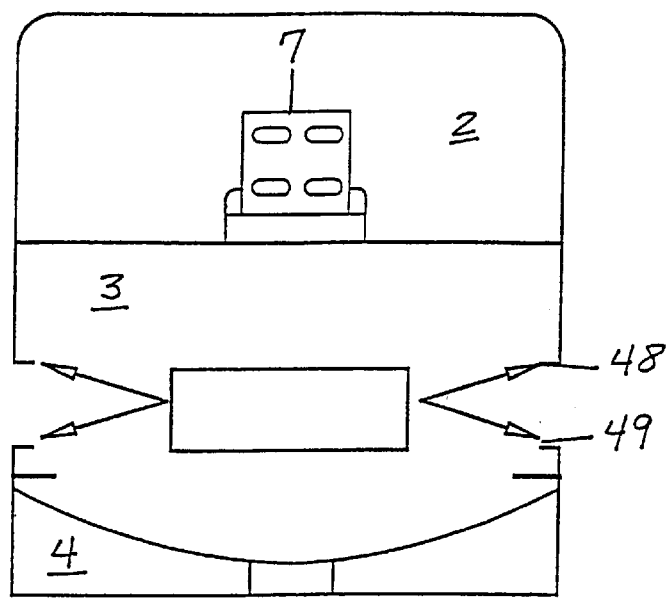
FIG. 15 is a side view of the can section showing the location of the seals.
Figure 16:
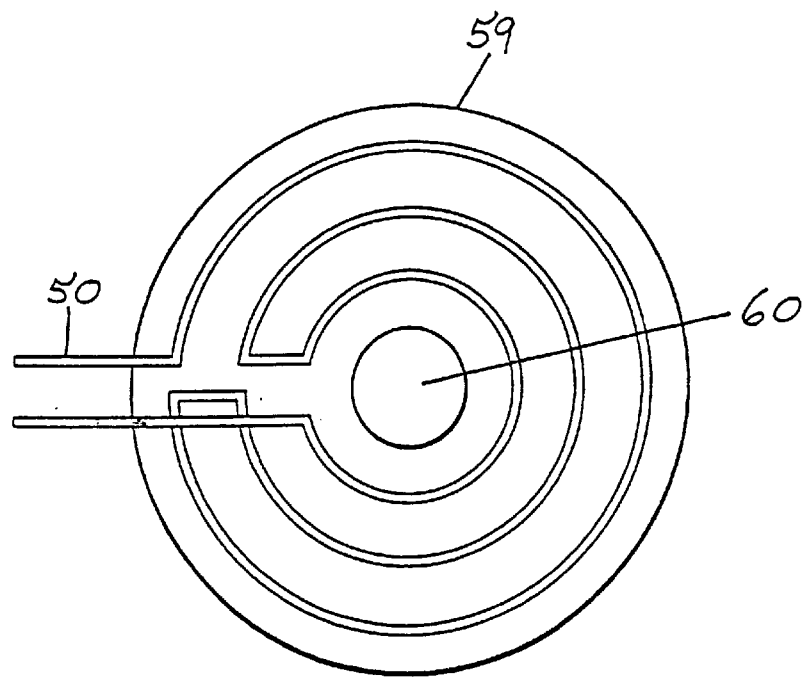
FIG. 16 is a top view of the donut type heater.

FIG. 13 is an enlarged top view of the water sprayer 11 showing the numerous openings in the sprayer 11 through which water 13 passes and the center opening 47 where the grinder 10 resides. FIG. 14 is an enlarged top view of the screen type filter 15 showing the center opening into which the auger 12 is inserted. FIG. 15 shows the location of the seals 48, 49 that prevent moisture from entering the coffee can 37. FIG. 16 is an enlarged top view of the donut type heater 59 showing the heating element 50 and the center opening 60.

FIG. 17 shows the dome shaped lower surface of the coffee can 37 through which an opening is made that feeds coffee beans 9 into the grinder 10. The coffee can 37 is especially designed to be used with the present invention. The coffee can 37 has a peel off opening (not shown) on the top and bottom surfaces of the coffee can 37. The openings in the top and bottom surfaces of the coffee can 37 are for the shaft 8 of the motor 7. However, the opening in the bottom surface is also used to dispense the coffee beans 9.

FIG. 18 shows the location of the solenoid valve 41 and the passageway 40 between the cooking section 5 and the drain 16 in relation to the other components of the cooking section 5 and the pot section 6. FIG. 18 also shows the overflow outlet 55 of the cooking section 5.

Figure 9:
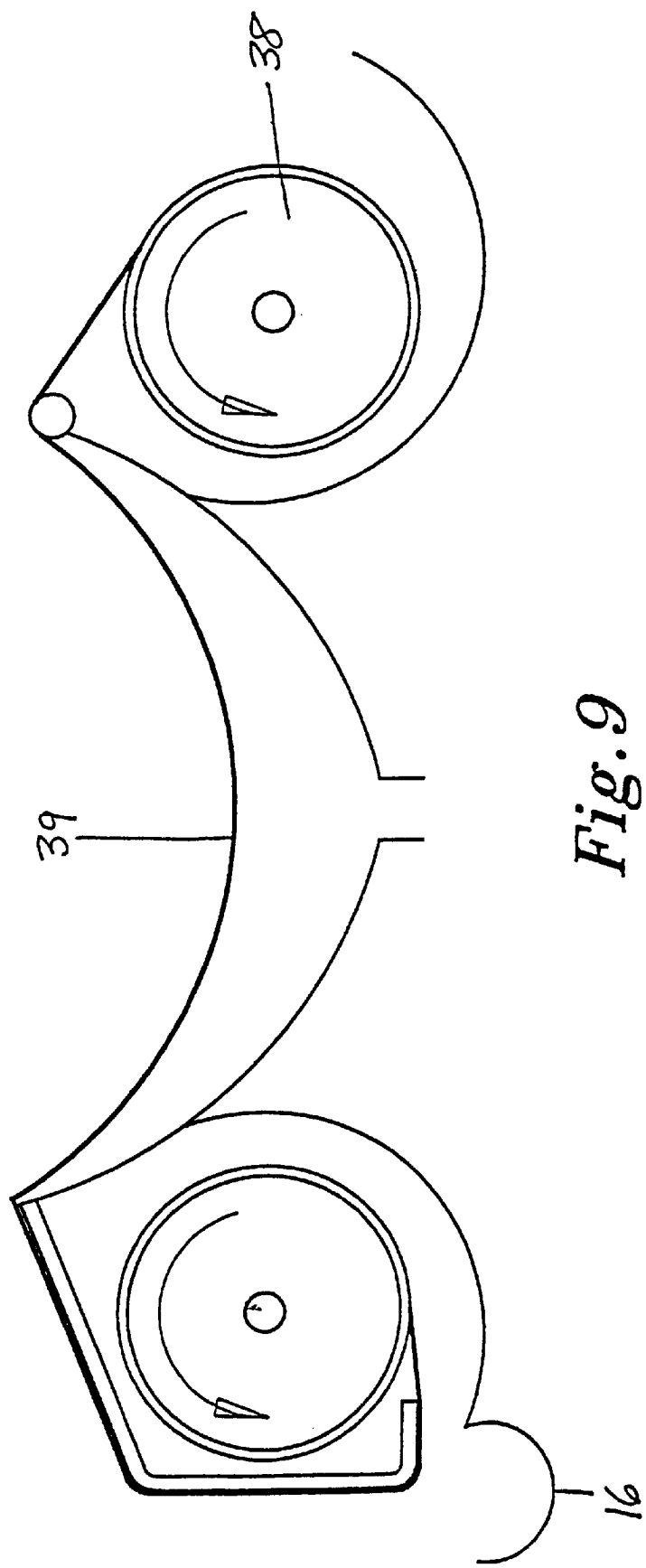
FIG. 9 is an enlarged scale front view of the filter on rolls.

FIGS. 8 and 9 show an alternate embodiment of the present invention. In the alternate embodiment, the concave shaped screen type filter 15 is replaced by a filter 39 on rolls 38. The filter 39 is either a paper or a screen type filter 39. FIG. 8 shows that the coffee beans 9 are continuously removed and discarded into the drain 16 after the coffee solution 17 has been extracted. A filter 39 on rolls 38 does not have to be changed for at least three months. When a filter 39 on rolls 38 is used, the cleaning cycle involves cleaning the filter 39 and the cooking section 5 of the coffee maker 1, because the filter 39 on rolls 38 is a continuous self-cleaning arrangement. During the cleaning cycle, the dispensing of the coffee beans 9 is discontinued. The dispensing of the coffee beans 9 is stopped when the rotation of the auger 12 is reversed which initiates the cleaning cycle.

Figure 19A:
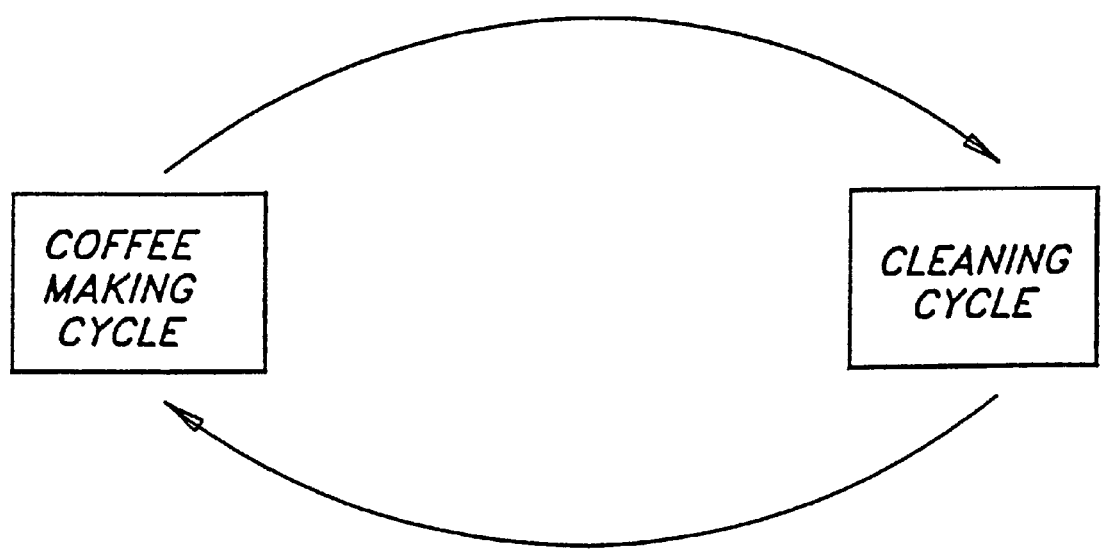
FIG. 19A is a block diagram showing that the present invention is a closed loop cyclic process.
Figure 19B:
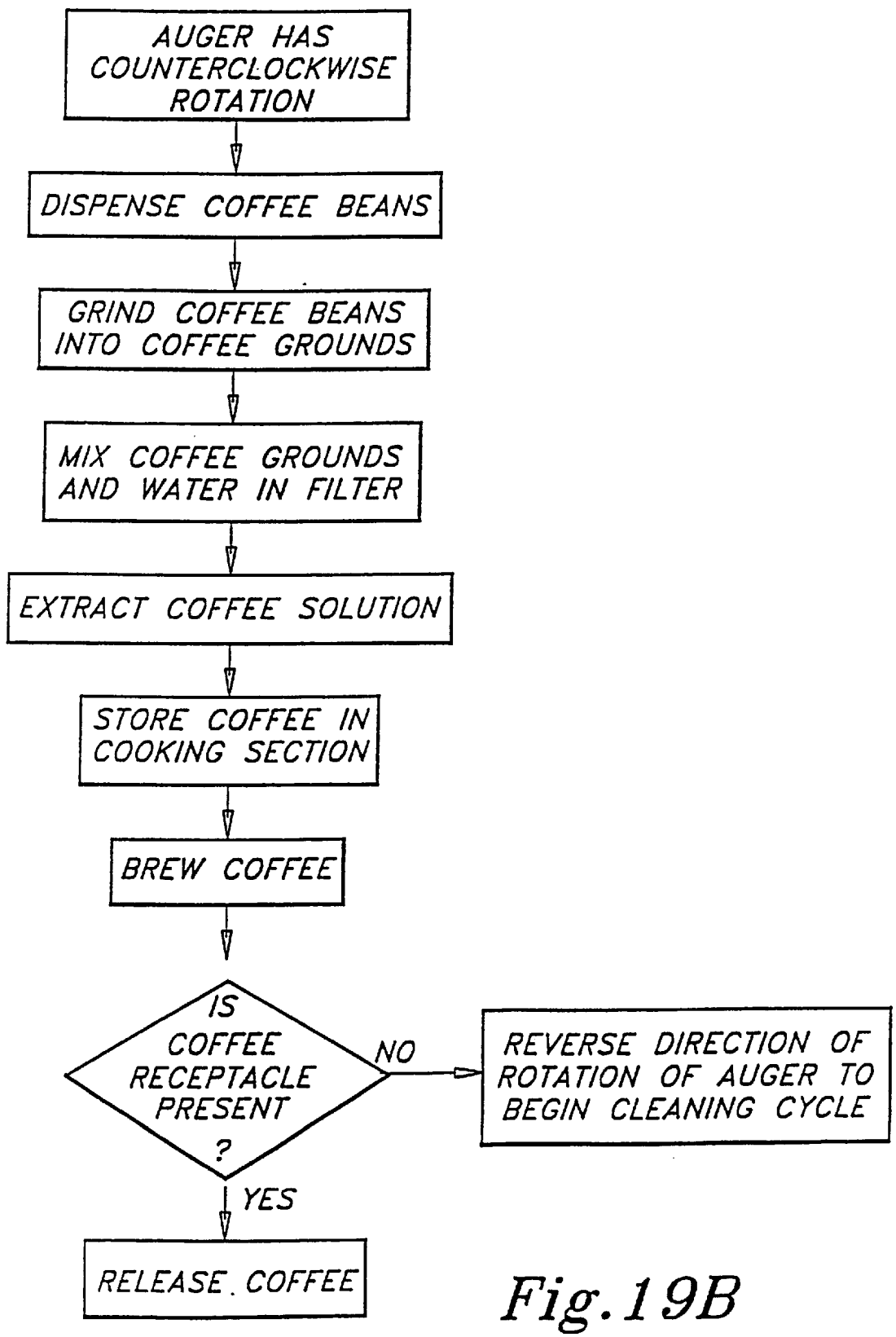
FIG. 19B is a block diagram showing the processing steps of the coffee making cycle.
Figure 19C:
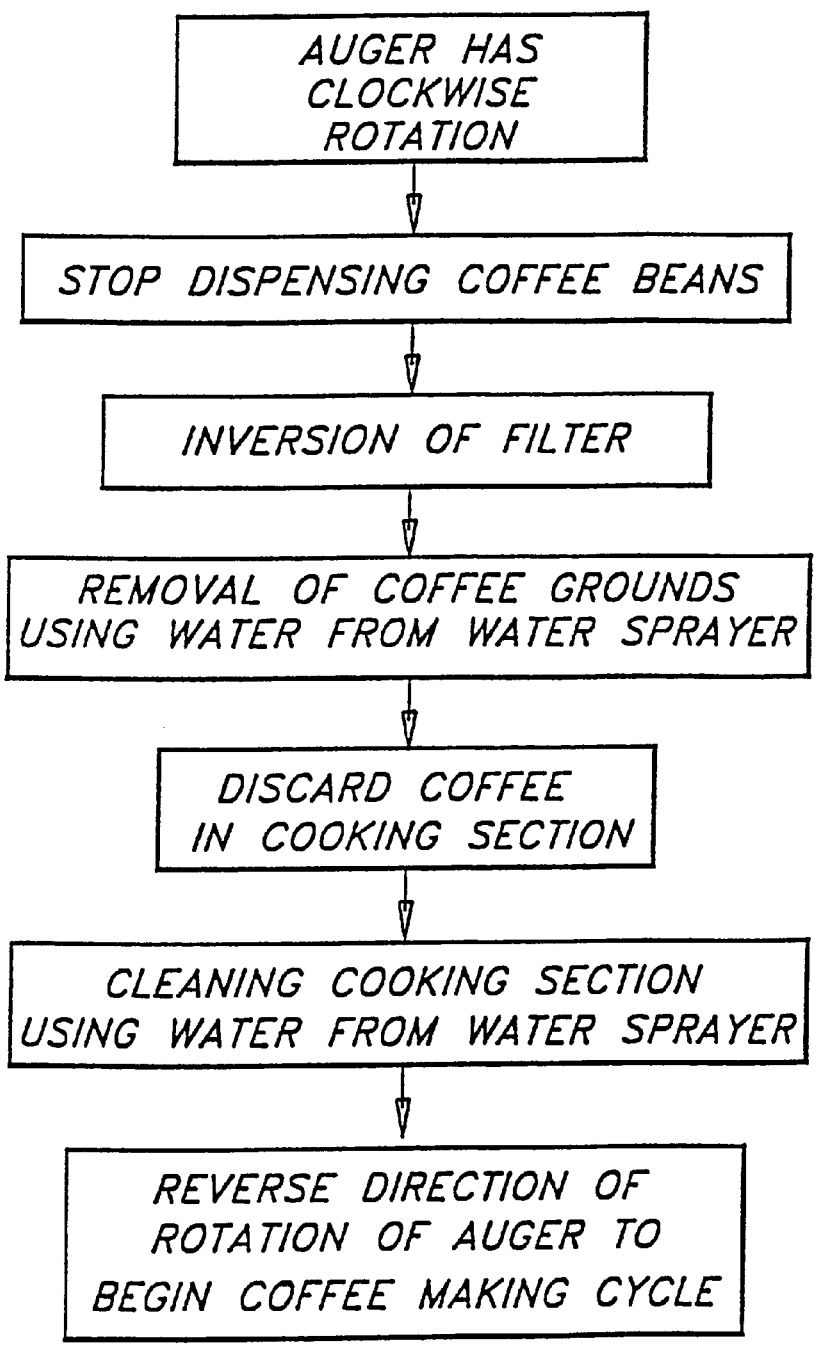
FIG. 19C is a block diagram showing the processing steps of the cleaning cycle.

FIG. 19A is a block diagram showing that the present invention is a closed loop cyclic process. FIG. 19B shows the processing steps of the coffee making cycle while FIG. 19C shows the processing steps of the cleaning cycle.

Figure 20:
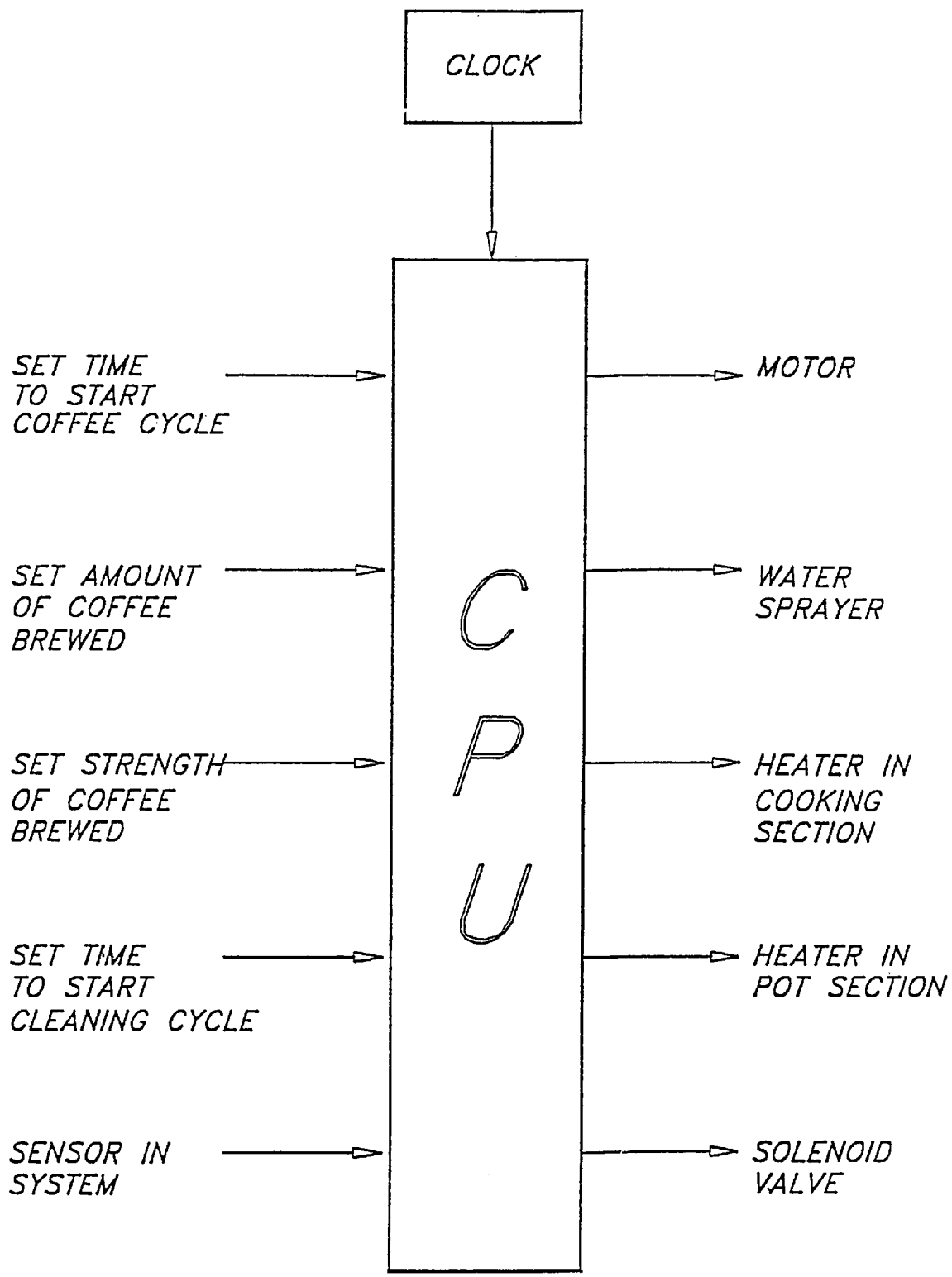
FIG. 20 is a diagram showing the inputs and outputs of the central processing unit (CPU).
Figure 24:
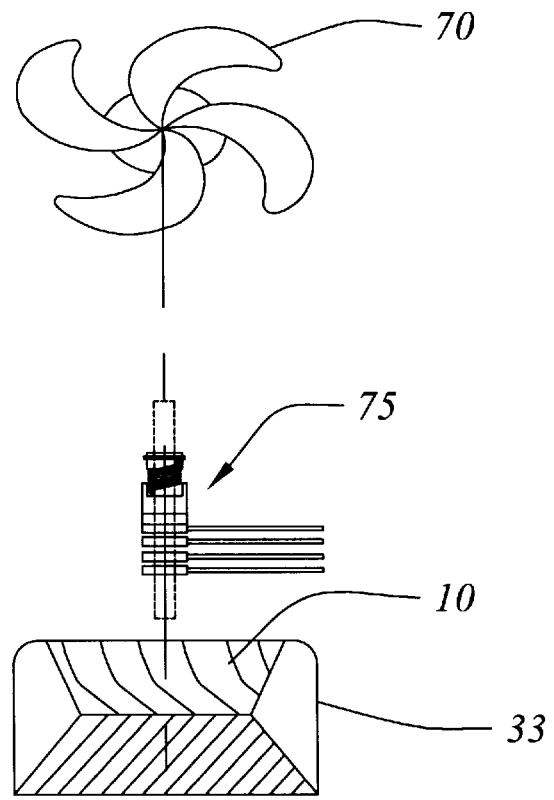
FIG. 24 is an exploded side view of a door assembly portion of a preferred embodiment of the invention for permitting selective opening and closing of the passage through the grinder help prevent moisture from entering the can section through the grinder during the cleaning and cooking stage so that the coffee beans are thereby protected from absorbing the moisture.
Figure 25:
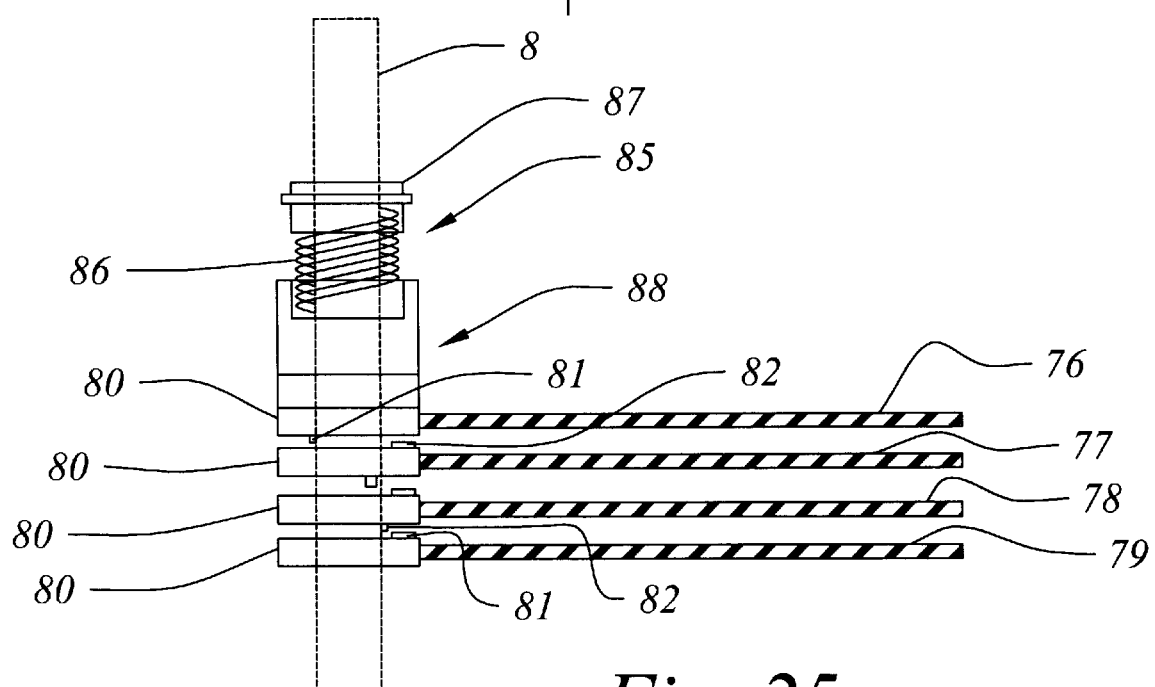
FIG. 25 is a side view of the door assembly.

FIG. 20 is a diagram showing the central processing unit (CPU) that controls the coffee making and self-cleaning processes of the coffee maker 1. The CPU receives multiple inputs and has multiple outputs. The amount of coffee 17 made is determined by the length of the coffee making cycle while the strength of the coffee made 17 is determined by the amount of water 13 sprayed and the amount of coffee beans 9 ground. For strong coffee 17 more coffee beans 9 are ground without increasing the amount of water 13 sprayed, while for weaker coffee 17 more water 13 is sprayed without increasing the amount of coffee beans 9 ground.

FIG. 21 is a diagram illustrating an embodiment of the invention having a propeller type (or brush-type) agitator 70 that is mounted to the grinder or the upper end of the auger so that when the grinder or auger is rotated (preferably clockwise) in the cleaning mode, the agitator is rotated in the coffee can to brush coffee beans away from the opening of the grinder to help prevent moisture entering the coffee beans in the can section. In use, the propeller-type agitator 70 located directly above the grinder 10 sweeps away coffee beans 9 from the opening of the coffee can 37.

To further help prevent moisture from entering the can section from the grinder section (no matter where the grinder is positioned), a door assembly 75 such as the type illustrated in FIGS. 24 through 27 may be included above the grinder 10 (and between the grinder and agitator 70 if the agitator is present) to permit selective opening and closing of the passage 33 between the can and grinder sections. The embodiment illustrated in these figures is primarily designed for use in an embodiment of the invention where the grinder is at the base of the can 37 as illustrated in FIG. 8.

Figure 26:
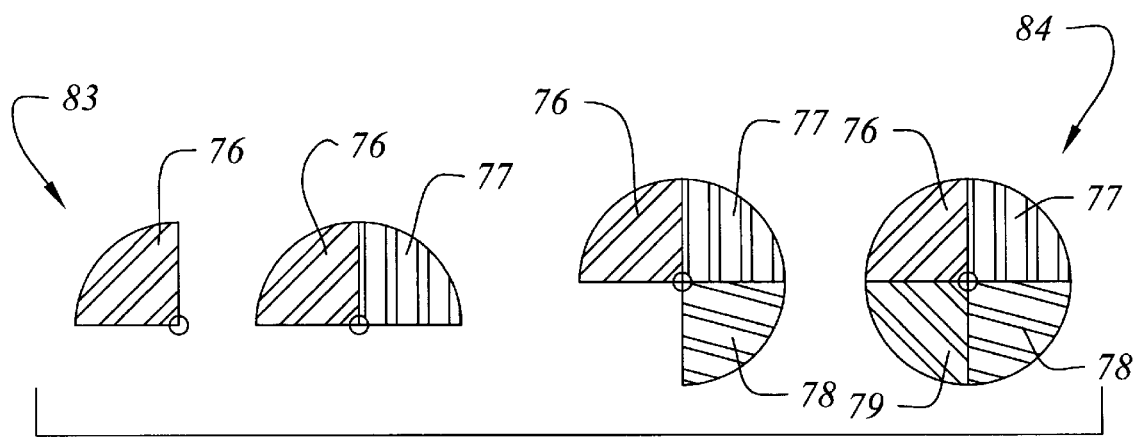
FIG. 26 illustrates the positioning of the doors between their open and closed positions.

In such an embodiment, a plurality of pie wedge-shaped doors 76, 77, 78, 79 are each mounted to the shaft 8 with a corresponding mounting ring 80 located at one of the vertices of the respective door. The mounting rings each have tabs 81,82 (well known in the art) that engage one another in a series to help rotate the doors on the shaft to either spread the door open or closed in a fan like manner as depicted in FIG. 26. As the auger is rotated in a first direction (preferably counter-clockwise), the door maneuvered so that the doors are fanned to an open position 83 (see FIG. 26) where the passage 33 of the grinder 10 is open to permit passage of coffee beans therethrough. When the auger turns in a second direction opposite the first direction (preferably clockwise) the doors are spread to a closed position 84 where they block the passage of the grinder 10. Preferably, the auger is required to complete one full revolution in this second direction to position the doors in their closed position 84. In use, when the auger has turned as far as it can go in the first (counter-clockwise) direction during the cooking operation, the CPU has the auger turn one complete revolution in the second (clockwise) direction to close the doors to prevent moister from passing through the passage an entering the coffee beans in the can section.

Preferably, a biasing assembly 85 with a spring 86 interposed between a stop assembly 87 fixedly coupled to the shaft 8 and a sleeve 88 slidably disposed on the shaft provides a downwards biasing force on the mounting rings of the doors to keep the doors close together to help keep the passage fully closed when the doors are in the closed position. The stop assembly 87 forces the biasing force of the spring to be directed downwards on to the sleeve which is interposed between the spring and mounting collar of the top most door 76. The sleeve abuts both the spring at one end and the mounting collar of the top most door so that the pressure of the spring against the sleeve is applied downwards on to the doors to keep the doors close or tight against one another. This biasing assembly also allows the connection between the doors (i.e., the tabs 81,82) to slip when they reach either the open or closed positions.

Figure 27:
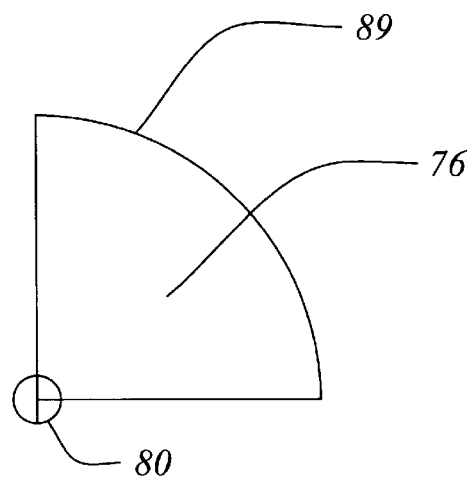
FIG. 27 is a plan view of one face of a door of the door assembly illustrating the resiliently deformable edging.

With reference to FIG. 27, even more preferably, the doors each have a resiliently deformable edging 89 around their outer perimeters to form a seal between adjacent doors and also between the doors and the passage 33 of the grinder when the doors are in their closed position.

Additionally, it should be understood that a similar (yet slightly modified) door assembly may be used in embodiments where the grinder upwardly extends into the can section. In this kind of embodiment, the doors may include downwardly depending arcuate wall sections along their outer arcuate edge to form a wall completely around the portion of the grinder upwardly extending into the can section so that this upper portion of the grinder is enclosed by the doors to provide an adequate moisture barrier to prevent moisture from entering the coffee beans in the can section.

FIGS. 22 and 23 illustrate a preferred embodiment of the invention where plurality of coiled compression springs 72 are disposed in corresponding bores in the heater and upwardly extended from the heater. Resting on the top ends of the springs is a support ring 74 on which the coffee server is rested. This configuration provides a highly stable mechanism for keeping the coffee server above the server so that it is harder to knock over the coffee server.

FIGS. 28 and 29 illustrate an arcuate adapter 90 with a rounded bottom that may be attached to an open end of a traditional cylindrically shaped coffee can 91. This adapter allows the use of the traditional coffee can 91 in place of the can section 37 normally used with the invention. As illustrated in FIGS. 28 and 29 the adapter 90 has a central bottom hole 92 therethrough that is positioned over or adjacent the grinder 10 so that coffee beans may pass from the coffee can through the adapter and into the grinder.

FIGS. 30 through 32 illustrate an embodiment of the invention having a container carousel 100 disposed in the can section 3. The container carousel is rotatably mounted on the shaft 8 such that the shaft extends through a central bore 102 in the container carousel. The container carousel also has a plurality containers 104 outwardly radiating from the center bore of the container carousel. Each of the containers of the container carousel is adapted for holding different types coffee beans 9 therein. The container carousel has an outer housing 106 surrounding the containers 104. Each of the containers of the container carousel has a bottom opening with the outer housing 106 of the container carousel forming a closure for each of the bottom openings of the containers. The outer housing the container carousel also has a chute 108 positioned beneath the containers and above the grinder. In use, the containers 104 are rotatable in the carousel container about the shaft 8 such that a single container is positionable above the chute to permit passage through the chute of coffee beans from the single container positioned about the chute. The containers may be rotatable by a user's hand or optionally, a controller is connected to the CPU and the motor for permitting the user to selectively rotate the containers about the shaft so that a user may select which container they would like to have coffee beans provided from. The controller also preferably includes a means for controlling the amount of beans passed through the chute so that a user may pour enough coffee beans make a single cup of coffee or a whole pot of coffee.

Figure 33:
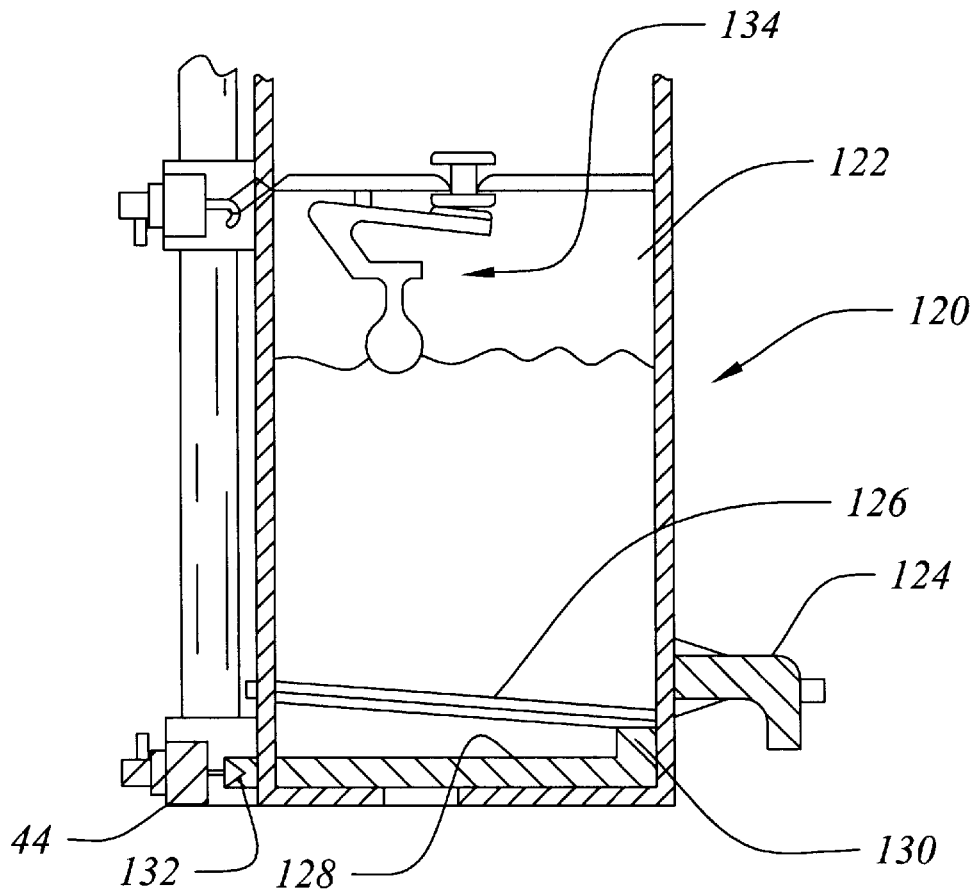
FIG. 33 is a cross sectional view of an other embodiment of the present invention where the pot section comprises an enclosed reservoir with a spigot to permit flow of brewed coffee therefrom.
Figure 34:
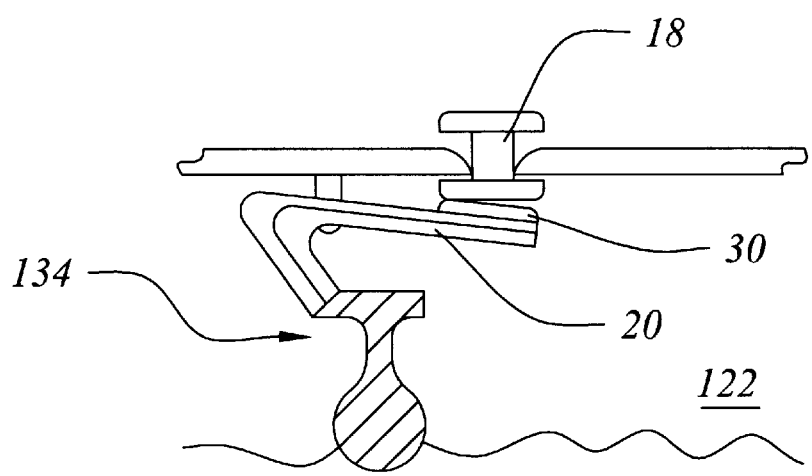
FIG. 34 is an enlarged side view of the pivoting arm region of the embodiment in FIG. 33 where the protuberant end is replaced with a float which closes the plug when the fluid level in the reservoir reaches a predetermined level.

FIGS. 33 and 34 illustrate a commercial embodiment 120 of the present invention where the pot section is completely enclosed to form a reservoir 122 for holding brewed coffee so that the coffee server 22 is not needed. A spigot 124 is fluidly connected to the reservoir to permit removal of brewed coffee from the reservoir 122. In this embodiment 120, the bottom heater 126 is angled to direct the flow of brewed coffee in the reservoir 122 towards the spigot 124. A drain conduit 128 is located at the bottom of the reservoir 122 and has a first opening 130 adjacent the spigot. The drain conduit 128 also has a second opening at the water control flow valve 44 adjacent the drain outlet 28 so that fluid from the reservoir 122 may also be drained out of the drain outlet when needed.

FIG. 34 illustrates the modification to the pivot arm region of the commercial embodiment 120 in FIG. 33. In this embodiment, a ball float assembly 134 is substituted in place the protuberant end 31 of the pivot arm 20. In use, the ball float assembly 134 causes the pivot arm to pivot upwards to close the bimetal plug 18 when the fluid level of brewed coffee in the reservoir 122 is above a predetermined level and to pivot the pivot arm downwards to open the opening between the cooking section 5 and the reservoir 122 when the fluid level of brewed coffee in the reservoir below the predetermined level.

The coffee maker 1 can be programmed to start making coffee 17 at a specified time and to grind a specified amount of coffee beans 9 each morning. The control panel 25 includes a timer to start the coffee maker 1 at a time specified by the consumer and to start the self-cleaning cycle at a time set by the consumer. For example, the consumer can set the coffee maker 1 to automatically stop making coffee 17 and to begin the self-cleaning cycle if the consumer has not physically handled the coffee maker 1 for more than 4 hours. The control panel 25 gives the consumer complete control over the coffee making process.

There are numerous variations and modifications of the present invention that are within the scope of the invention as claimed. It should be understood by those skilled in the art that various modifications and adaptations as well as alternative embodiments may be contemplated. It is to be understood that the present invention is not limited to the embodiments described above, but encompasses any and all embodiments within the scope of the following claims. The preferred embodiments of the present invention disclosed herein are intended to be illustrative only and are not intended to limit the scope of the invention.

I claim:

1. A multi-stage coffee brewer and grinder combination comprising:

a motor and a motor section that houses said motor;

a gearing means for rotating a shaft wherein said gearing means is housed in said motor section;

a can section comprising a can of coffee beans;

a grinding section comprising a grinder, a sprayer, a filter, and an auger;

a propeller-type agitator disposed directly above said grinder, said agitator rotating in said can section when said shaft is rotated;

said shaft extending from said motor to said auger;

a cooking section that collects and brews the coffee, and having a heater therein;

a switching means in said cooking section to stop said coffee production when said cooking section collects too much of said coffee;

an overflow means in said cooking section to siphon off any excess of said coffee;

a pot section that houses a removable receptacle;

an opening between said cooking section and said pot section;

a plug in said opening;

a pivoting arm in said pot section;

a second heater in said pot section; and a tension bearing means for adjusting the distance between said pivoting arm and said removable receptacle within said pot section;

wherein said gear means is a gearbox housed is said motor section;

wherein said can of coffee beans has an opening on the top surfaces and an opening on the bottom surface;

wherein said shaft passes through said can of coffee beans using said top opening and said bottom opening in said can of coffee beans;

wherein said sprayer encircles said grinder;

wherein said grinder comprises a top grinder and a bottom grinder and said grinder is housed in an enclosure;

wherein said filter is invertable having a concave shape during the coffee making cycle and a convex shape during the cleaning cycle;

wherein said switching means is a float switch;

wherein said overflow means is an opening in said cooking section that connects to said drain;

wherein said plug is a temperature sensitive bimetal and said plug has a magnet attached to the bottom surface of said plug;

wherein said pivoting arm pivots around a spring and said pivoting arm has a protuberance at one end and a magnet at the other end;

wherein said auger has a top o-ring and a bottom o-ring;

wherein said heater has a donut configuration with a center opening;

wherein said plug is disposed in the center opening of said heater;

wherein said second heater has a donut configuration with a center opening; and wherein said tension bearing means is a spring disposed in said center opening of said second heater.

2. The multi-stage coffee brewer and grinder combination of claim 1, wherein a filter on rolls is substituted for said invertable filter.

3. The multi-stage coffee brewer and grinder combination of claim 1, further comprising a door assembly for selectively opening and closing passage of moisture between said can section and said grinder of said grinding section.

4. The multi-stage coffee brewer and grinder combination of claim 3, wherein said door assembly comprises a plurality of pie wedge-shaped doors each having a vertex mounted to said shaft, a mounting rings each having tabs engaging one another to permit rotation of said doors on said shaft between open and closed positions, wherein said doors block passage of moisture and coffee beans between said can section and said grinder of said grinder section when positioned in said closed position, wherein said doors permit passage of moisture and coffee beans between said can section and said grinder when positioned in said open position.

5. The multi-stage coffee brewer and grinder combination of claim 4, wherein said door assembly further comprises a biasing assembly disposed on said shaft for providing a downwards biasing force on said mounting rings of said doors such that said doors are forced together when in said closed position to block passage of moisture between adjacent doors when said doors are position in said closed position.

6. The multi-stage coffee brewer and grinder combination of claim 4, wherein each of said doors has a resiliently deformable edging therearound to form a moisture-proof seal between adjacent doors and between said doors and said grinder when said doors are positioned in said closed position.

7. The multi-stage coffee brewer and grinder combination of claim 1, further comprising an arcuate adapter having a rounded bottom, said arcuate adapted being mounted to a bottom surface of said can section, said adapter having a central bottom hole therethrough, said central bottom hole being positioned over said grinder to permit passage of coffee beans therethrough.

8. A multi-stage coffee brewer and grinder combination comprising:

a motor and a motor section that houses said motor;

a gearing means for rotating a shaft wherein said gearing means is housed in said motor section;

a can section comprising a can of coffee beans;

a grinding section comprising a grinder, a sprayer, a filter, and an auger;

a propeller-type agitator disposed directly above said grinder, said agitator rotating in said can section when said shaft is rotated;

said shaft extending from said motor to said auger;

a cooking section that collects and brews the coffee, and having a heater therein;

a switching means in said cooking section to stop said coffee production when said cooking section collects too much of said coffee;

an overflow means in said cooking section to siphon off any excess of said coffee;

a pot section that houses a removable receptacle;

an opening between said cooking section and said pot section;

a plug in said opening;

a pivoting arm in said pot section;

a second heater in said pot section; and a tension bearing means for adjusting the distance between said pivoting arm and said removable receptacle within said pot section;

a container carousel disposed in said can section, said container carousel being rotatably mounted on said shaft such that said shaft extends through a central bore in said container carousel, said container carousel having a plurality containers outwardly radiating from said center bore of said container carousel, each of said containers of said container carousel being adapted for holding coffee beans therein, said container carousel having an outer housing, each of said containers of said container carousel having a bottom opening, said outer housing of said container carousel forming a closure for each of said bottom openings of said containers, said outer housing said container carousel having a chute positioned beneath said containers and above said grinder, said containers being rotatable about said shaft such that a single container is positionable above said chute to permit passage through said chute of coffee beans from said single container positioned about said chute.

9. The multi-stage coffee brewer and grinder combination of claim 1, wherein said pot section has a reservoir for holding fluid therein and a spigot fluidly connected to said reservoir.

10. A multi-stage coffee brewer and grinder combination comprising:

a motor and a motor section that houses said motor;

a gearing means for rotating a shaft wherein said gearing means is housed in said motor section;

a can section comprising a can of coffee beans;

a grinding section comprising a grinder, a sprayer, a filter, and an auger;

a propeller-type agitator disposed directly above said grinder, said agitator rotating in said can section when said shaft is rotated;

said shaft extending from said motor to said auger;

a cooking section that collects and brews the coffee, and having a heater therein;

a switching means in said cooking section to stop said coffee production when said cooking section collects too much of said coffee;

an overflow means in said cooking section to siphon off any excess of said coffee;

a pot section that houses a removable receptacle;

an opening between said cooking section and said pot section;

a plug in said opening;

a pivoting arm in said pot section;

a second heater in said pot section;

a tension bearing means for adjusting the distance between said pivoting arm and said removable receptacle within said pot section; and a door assembly for selectively opening and closing passage of moisture between said can section and said grinder of said grinding section, said door assembly including a plurality of pie wedge-shaped doors each having a vertex mounted to said shaft, a mounting rings each having tabs engaging one another to permit rotation of said doors on said shaft between open and closed positions, wherein said doors block passage of moisture and coffee beans between said can section and said grinder of said grinder section when positioned in said closed position, wherein said doors permit passage of moisture and coffee beans between said can section and said grinder when positioned in said open position.

11. The multi-stage coffee brewer and grinder combination of claim 10, wherein said door assembly further comprises a biasing assembly disposed on said shaft for providing a downwards biasing force on said mounting rings of said doors such that said doors are forced together when in said closed position to block passage of moisture between adjacent doors when said doors are position in said closed position.

12. The multi-stage coffee brewer and grinder combination of claim 10, wherein each of said doors has a resiliently deformable edging therearound to form a moisture-proof seal between adjacent doors and between said doors and said grinder when said doors are positioned in said closed position.

13. The multi-stage coffee brewer and grinder combination of claim 8, further comprising a door assembly for selectively opening and closing passage of moisture between said can section and said grinder of said grinding section.

14. The multi-stage coffee brewer and grinder combination of claim 13, wherein said door assembly comprises a plurality of pie wedge-shaped doors each having a vertex mounted to said shaft, a mounting rings each having tabs engaging one another to permit rotation of said doors on said shaft between open and closed positions, wherein said doors block passage of moisture and coffee beans between said can section and said grinder of said grinder section when positioned in said closed position, wherein said doors permit passage of moisture and coffee beans between said can section and said grinder when positioned in said open position.

15. The multi-stage coffee brewer and grinder combination of claim 14, wherein said door assembly further comprises a biasing assembly disposed on said shaft for providing a downwards biasing force on said mounting rings of said doors such that said doors are forced together when in said closed position to block passage of moisture between adjacent doors when said doors are position in said closed position.

16. The multi-stage coffee brewer and grinder combination of claim 14, wherein each of said doors has a resiliently deformable edging therearound to form a moisture-proof seal between adjacent doors and between said doors and said grinder when said doors are positioned in said closed position.

17. The multi-stage coffee brewer and grinder combination of claim 8, further comprising an arcuate adapter having a rounded bottom, said arcuate adapted being mounted to a bottom surface of said can section, said adapter having a central bottom hole therethrough, said central bottom hole being positioned over said grinder to permit passage of coffee beans therethrough.

* * * * *